United States Patent
Hirao

(10) Patent No.: US 8,730,423 B2
(45) Date of Patent: May 20, 2014

(54) DISPLAY DEVICE, LIQUID CRYSTAL DISPLAY DEVICE, AND METHOD FOR PRODUCING A DISPLAY DEVICE

(75) Inventor: Kazuma Hirao, Tokyo (JP)

(73) Assignee: Sharp Kabushiki Kaisha, Osaka (JP)

(*) Notice: Subject to any disclaimer, the term of this patent is extended or adjusted under 35 U.S.C. 154(b) by 1492 days.

(21) Appl. No.: 11/722,818

(22) PCT Filed: Nov. 16, 2005

(86) PCT No.: PCT/JP2005/021018
§ 371 (c)(1),
(2), (4) Date: Jun. 26, 2007

(87) PCT Pub. No.: WO2006/080129
PCT Pub. Date: Aug. 3, 2006

(65) Prior Publication Data
US 2007/0285595 A1      Dec. 13, 2007

(30) Foreign Application Priority Data
Jan. 27, 2005   (JP) ................................ 2005-020203

(51) Int. Cl.
*G02F 1/1333* (2006.01)

(52) U.S. Cl.
USPC .......................................................... 349/54

(58) Field of Classification Search
USPC .......................................................... 349/54
See application file for complete search history.

(56) References Cited

U.S. PATENT DOCUMENTS

| 5,268,678 | A | 12/1993 | Nakazawa et al. |
| 6,429,910 | B1 | 8/2002 | Hirata et al. |
| 6,955,951 | B2 * | 10/2005 | Hashimoto .................. 438/149 |

FOREIGN PATENT DOCUMENTS

| JP | 03-023425 A | 1/1991 |
| JP | 04-355729 A | 12/1992 |
| JP | 08-171081 A | 7/1996 |
| JP | 10-123545 A | 5/1998 |
| JP | 11-052928 A | 2/1999 |
| JP | 2001-100229 A | 4/2001 |
| JP | 2002-221947 A | 8/2002 |

OTHER PUBLICATIONS

Official Communication for PCT Application No. PCT/JP2005/021018; mailed on Jan. 17, 2006.

* cited by examiner

*Primary Examiner* — Mark Robinson
*Assistant Examiner* — Erin Chiem
(74) *Attorney, Agent, or Firm* — Keating & Bennett, LLP

(57) ABSTRACT

A liquid crystal display device includes: a plurality of source lines (2) to which a signal voltage according to a source signal is applied; a first wire (3a) and a second wire (3b) for fixing a wire breakage that are configured so that they can be connected to opposite ends of at least one of the plurality of source lines (2); and a buffer section (4) provided between the first wire (3a) and the second wire (3b) for impedance conversion along the first wire (3a) and the second wire (3b), wherein the liquid crystal display device includes spare capacitors (10a) and (10b) for adjusting a signal waveform according to the source signal applied to the source lines (2a) and (2b) with the first wire (3a) and the second wire (3b) being connected to the source lines (2a) and (2b).

18 Claims, 14 Drawing Sheets

DISPLAY DEVICE, LIQUID CRYSTAL DISPLAY DEVICE, AND METHOD FOR PRODUCING A DISPLAY DEVICE

BACKGROUND OF THE INVENTION

1. Field of the Invention

The present invention relates to a display device, a liquid crystal display device and a method for producing a display device, and more particularly to a method for fixing a wire breakage in a matrix-type liquid crystal display device.

2. Description of the Related Art

A matrix-type display device includes pixels arranged in a matrix pattern, each pixel being the minimum unit of an image. Among others, active matrix-type liquid crystal display devices including a switching element for each pixel are capable of displaying high-definition images and have been widely used.

An active matrix-type liquid crystal display device includes a plurality of gate lines extending in parallel to one another and a plurality of source lines perpendicular to the gate lines for supplying display signals to the pixels. Therefore, if a wire breakage occurs in a display wire such as a gate line or a source line in an active matrix-type liquid crystal display device, the display signal from the driver circuit is not supplied to the display wire beyond the wire breakage position, thus significantly deteriorating the display quality.

In order to solve the problem, Patent Document 1 (Japanese Laid-Open Patent Publication No. 3-23425), for example, proposes a matrix-type display device including a spare wire that can be connected to at least one of a gate line and a source line, wherein at least one of the gate line and the source line in which a wire breakage has occurred can be connected to the spare wire, whereby it is possible to fix a wire breakage defect.

Moreover, Patent Document 2 (Japanese Laid-Open Patent Publication No. 8-171081) proposes a matrix-type display device including a buffer circuit along a spare wire as described above to thereby compensate for a voltage drop due to the routing of the spare wire and to thus improve the display quality.

Patent Documents 3 (Japanese Laid-Open Patent Publication No. 11-5292) and 4 (Japanese Laid-Open Patent Publication No. 2002-22194) disclose improvements regarding the buffer circuit.

FIG. 15 is an equivalent circuit diagram showing a liquid crystal display device 150 in which it is possible to fix a wire breakage along a source line 102, based on the description of Patent Documents 1 and 2.

The liquid crystal display device 150 includes a liquid crystal display panel 140, a gate driver 109 provided along the left side of the liquid crystal display panel 140, and a source driver 107 provided along the upper side of the liquid crystal display panel 140. The liquid crystal display panel 140 includes an active matrix substrate, a counter substrate provided so as to oppose the active matrix substrate, and a liquid crystal layer interposed between the substrates. Provided on the active matrix substrate are a plurality of gate lines 101 extending in the horizontal direction in the figure and a plurality of source lines 102 extending in the vertical direction in the figure. A thin film transistor (hereinafter abbreviated as a "TFT") 111, being a switching element, is provided at each intersection between the gate line 101 and the source line 102. The source driver 107 includes output amplifiers 106 each connected to a source line 102, and a buffer circuit 104. Moreover, a first spare wire 103a and a second spare wire 103b are provided, wherein the first spare wire 103a extends perpendicular to the source lines 102 in an area along the upper side of the liquid crystal display panel 140 to be connected to the input side of the buffer circuit 104 in the source driver 107, and the second spare wire 103b extends from the output side of the buffer circuit 104 and passes through the upper side, the right side and the lower side of the liquid crystal display panel 140 to be extending perpendicular to the source lines 102 in an area along the lower side of the liquid crystal display panel 140.

FIG. 16 is an equivalent circuit diagram showing the liquid crystal display device 150, wherein a wire breakage has occurred in the source line 102, and the defect has been fixed by connecting the source lines 102 (102a and 102b) with the spare wires 103 (the first spare wire 103a and the second spare wire 103b).

In FIG. 16, the source line 102 breaks at a wire breakage position X1 to be divided into a source line 102a above the wire breakage position X1 and a source line 102b below the wire breakage position X1. The source line 102a and the first spare wire 103a are connected together at an intersection A1, and the source line 102b and the second spare wire 103b are connected together at an intersection A2. This connection can be made by irradiating the intersections A1 and A2 with a light energy 123 such as laser light from the side of a glass substrate 120 to thereby make a contact hole in an insulating film 119 and to electrically connect the source line 102 with the spare wires 103, as shown in FIG. 17. Thus, a display signal from the output amplifier 106 in the source driver 107 is supplied to the source line 102b below the wire breakage position X1 via an upper portion of the source line 102a, the connection position (intersection) A1, the first spare wire 103a, the buffer circuit 104, the second spare wire 103b, and the connection position (intersection) A2. Thus, even if a wire breakage occurs in a display wire, the display signal from the driver circuit is supplied to the display wire beyond the wire breakage position, i.e., the wire breakage is fixed. The buffer circuit 104 functions as an amplifier for amplifying the display signal for impedance conversion along the spare wire 103 including the first spare wire 103a and the second spare wire 103b.

However, defect fixing methods as described above do not take into consideration the difference in the magnitude of the capacitance to be the load between an unbroken, normal source line 102 and the broken, divided source lines 102a and 102b.

The difference in the magnitude of the capacitance will now be described in detail.

FIG. 18 is an equivalent circuit diagram showing capacitances on the source line 102 per pixel.

As shown in FIG. 18, capacitances on the source line 102 include a liquid crystal capacitance Clc, a storage capacitance Ccs, a parasitic capacitance Csg occurring at the intersection between the source line 102 and the gate line 101, a parasitic capacitance CsdA occurring between the source line 102 and the drain electrode of the TFT 111 of the pixel on the right side of the source line 102, a parasitic capacitance CsdB occurring between the source line 102 and the drain electrode of the TFT 111 of the pixel on the left side of the source line 102, etc.

The liquid crystal capacitance Clc and the storage capacitance Ccs are connected to be loads only when a predetermined gate line 101 is selected and the TFT 111 is ON. With an ordinary active matrix-type liquid crystal display device, only one gate line 101 is being selected at any time, whereby the liquid crystal capacitance Clc and the storage capacitance Ccs do not present a heavy load on one source line 102. On the other hand, the remaining parasitic capacitances Csg, CsdA and CsdB are always present irrespective of the selection of the gate line 101, and thus present a heavy load on one source line 102. Specifically, one source line 102 receives the parasitic capacitances Csg, CsdA and CsdB multiplied by the number of gate lines 101, e.g., 768 in an XGA-resolution liquid crystal display device. The magnitude of the parasitic capacitance is not negligible with respect to the display quality of the liquid crystal display device, whereby the output amplifiers 106 and the buffer circuit 104 of the source driver 107 need to be provided with a capacity of accommodating the magnitude of the parasitic capacitance to be the load.

However, in an actual liquid crystal display device, it is not possible to know where a wire breakage of the source line 102 will occur.

For example, in a case where the source line 102 breaks at the wire breakage position X1 distant from the source driver 107 so as to be divided into the source line 102a above the wire breakage position X1 and the source line 102b below the wire breakage position X1, as shown in FIG. 16, the number of the parasitic capacitances Csg, CsdA and CsdB to be the load on the source line 102a is not significantly different from the number of the parasitic capacitances Csg, CsdA and CsdB to be the load on a normal source line 102. Therefore, the load on the source line 102a above the wire breakage position X1 is not significantly different from the load on a normal source line 102. On the other hand, the number of the parasitic capacitances Csg, CsdA and CsdB to be the load on the source line 102b is significantly fewer than the number of the parasitic capacitances Csg, CsdA and CsdB to be the load on a normal source line 102. Therefore, the load on the source line 102b below the wire breakage position X1 is very small as compared with the load on a normal source line 102.

Similarly, in a case where the source line 102 breaks at a wire breakage position X2 very close to the source driver 107 so as to be divided into a source line 102c above the wire breakage position X2 and a source line 102d below the wire breakage position X2, as shown in FIG. 19, the load on the source line 102c is very small as compared with the load on a normal source line 102. On the other hand, the load on the source line 102d is not significantly different from the load on a normal source line 102.

Thus, the load on a source line divided in a wire breakage varies, i.e., the distribution of the parasitic capacitance to be the load varies, depending on the wire breakage position.

FIG. 20 shows an output waveform W1 of a normal source line 102, and an output waveform W2 of the spare wire 103 to which another source line 102 broken in a wire breakage is connected.

In the source driver 107, the load on the output amplifier 106 and the load on the buffer circuit 104 are determined so that a normal source line 102 can be driven normally, as described above. However, if the source line 102 is divided by a wire breakage and the parasitic capacitance to be the load on a divided source line (e.g., the source line 102b) is very small, the waveform may overshoot or undershoot as shown in an output waveform W2 of FIG. 20.

If the degree of overshoot or undershoot is high, a more excessive voltage than a normal source line 102 applies on the liquid crystal layer. For example, with a normally-white liquid crystal display device, for example, pixels along the source line 102 where the wire breakage has occurred are darkened and appear to be a black line. With a normally-black liquid crystal display device, pixels along the source line 102 where the wire breakage has occurred are lightened and appear to be a bright line. Thus, the display quality deteriorates.

The overshoot or undershoot is less likely to influence the display when the resolution of the liquid crystal display device is low and the charging time of each pixel (one horizontal period). However, if the resolution is high (e.g., UXGA), the charging time is short and the overshoot or undershoot will be non-negligible. Moreover, with higher resolutions, the number of the parasitic capacitances Csg, CsdA and CsdB to be the load on the source line 102 also increases, thereby also increasing the difference between the load on a normal source line 102 and the load on a source line (e.g., the source line 102b) divided in a wire breakage.

When the screen size of the liquid crystal display device is increased, the area across which the parasitic capacitances Csg, CsdA and CsdB are formed increases, whereby the difference between the load on a normal source line 102 and the load on a source line 102 divided in a wire breakage will further increase as described above.

Thus, with the recent increase in the resolution and the screen size of a liquid crystal display device, the difference between the load on a normal source line and the load on a source line divided in a wire breakage further increases, thereby increasing the overshoot or undershoot and deteriorating the display quality.

SUMMARY OF THE INVENTION

The present invention has been made in view of the problem described above, and has an object to make it possible to fix a broken display wire when a wire breakage occurs, in such a manner that the decrease in the display quality is suppressed, irrespective of the wire breakage position.

In order to achieve the object set forth above, the present invention provides a spare capacitor for adjusting a signal waveform to be applied to a display wire that is connected to a spare wire.

Specifically, a display device of the present invention includes: a plurality of display wires to which display signal voltages are applied; a spare wire that can be connected to opposite ends of at least one of the plurality of display wires; and a buffer section provided along the spare wire for impedance conversion along the spare wire, wherein the display device includes a spare capacitor for adjusting a signal waveform to be applied to the display wire with the spare wire being connected the display wire.

With the above configuration, the spare wire can be connected to the opposite ends of at least one of a plurality of display wires. Therefore, when one of the plurality of display wires breaks, the spare wire can be connected to the broken display wire, whereby display signal voltages are applied to the display wire beyond the wire breakage position via the spare wire. Since the spare wire is provided with a spare capacitor for adjusting the signal waveform, it is possible to adjust the display signal waveform to be applied to the display wire via the spare wire and to suppress the decrease in the display quality by making the spare capacitor operative as necessary according to the wire breakage position.

Specifically, by making the spare capacitor operative for the spare wire, the load on a display wire divided in a wire breakage is made substantially the same as the load on a normal display wire that is not broken, thus adjusting the display signal waveform to be applied to the display wire via the spare wire. Therefore, the adjusted signal waveform is applied along the broken display wire via the spare wire, the buffer section and the spare capacitor, thereby maintaining substantially the same display quality as that of a normal display wire. Thus, when a display wire breaks, it is possible to fix the wire breakage along the display wire in such a manner that the decrease in the display quality is suppressed, irrespective of the wire breakage position.

In one embodiment, the spare capacitor includes a first electrode and a second electrode provided so as to oppose each other, and a first insulating film interposed between the first electrode and the second electrode.

With the above configuration, it is possible to hold the charge in the first insulating film between the first electrode and the second electrode, whereby the load on the display wire divided in a wire breakage, i.e., the display signal waveform to be applied to the divided display wire, is adjusted by the spare capacitor formed by the first insulating film.

In one embodiment, the first electrode is connected to the spare wire.

With the above configuration, the first electrode of the spare capacitor is connected in advance to the spare wire, whereby the spare capacitor can be made operative for a broken display wire by connecting the broken display wire and the spare wire to each other. When there is only one spare capacitor, the display signal waveform to be applied to the divided display wire is adjusted by the single spare capacitor. When there are a plurality of spare capacitors, the number of spare capacitors operative is adjusted by cutting off the connection between the first electrode of the spare capacitor and the spare wire for a predetermined number of spare capacitors as necessary. Thus, it is possible to adjust the load on the display wire divided in a wire breakage, and to adjust the display signal waveform to be applied to the display wire via the spare wire.

In one embodiment, the first electrode is configured so that the first electrode can be connected to the spare wire.

With the above configuration, the first electrode of the spare capacitor is configured so that the first electrode can be connected to the spare wire, whereby the spare capacitor can be connected to the spare wire and the display wire by connecting the broken display wire and the spare wire to each other and connecting the first electrode of the spare capacitor and the spare wire to each other. By connecting the first electrode of the spare capacitor and the spare wire for a predetermined number of spare capacitors as necessary, it is possible to adjust the number of spare capacitors to be made operative. Thus, it is possible to adjust the load on the display wire divided in a wire breakage, and to adjust the display signal waveform to be applied to the display wire via the spare wire.

In one embodiment, the display device includes a plurality of spare capacitors; and the first electrode of at least one of the plurality of spare capacitors is connected to the spare wire, and the first electrode of another one of the plurality of spare capacitors is configured so that the first electrode can be connected to the spare wire.

With the above configuration, where a spare capacitor is provided on the input side and on the output side of the buffer section of the spare wire, for example, the first electrode of the first spare capacitor is connected in advance to the spare wire while the first electrode of the second spare capacitor is configured so that the first electrode can be connected to the spare wire. Thus, it is possible to increase the variety in how the first electrode of the spare capacitor is connected to the spare wire.

In one embodiment, the spare wire is provided over the display wire via a second insulating film therebetween, and the spare wire can be connected to the display wire by making a contact hole in the second insulating film.

With the above configuration, when one of the plurality of display wires breaks, the intersection between the spare wire and the display wire, for example, is irradiated with a light energy to thereby destroy the second insulating film at the irradiated portion, thus making a contact hole that electrically connects the spare wire and the display wire to each other.

Thus, by making a contact hole in the second insulating film, a display signal voltage is applied to the display wire divided in a wire breakage via the spare wire.

In one embodiment, the first electrode is provided over the spare wire via a third insulating film therebetween, and the first electrode can be connected to the spare wire by making a contact hole in the third insulating film.

With the above configuration, the intersection between the first electrode of the spare capacitor and the spare wire is irradiated with a light energy, for example, to thereby destroy the third insulating film at the irradiated portion, thus making a contact hole that electrically connects the first electrode and the spare wire to each other. Thus, by making a contact hole in the third insulating film, the spare capacitor can be made operative for the spare wire.

In one embodiment, the spare wire includes a first wire being on an input side of the buffer section and a second wire being on an output side of the buffer section, and the spare capacitor is provided along the first wire.

With the above configuration, the spare capacitor is provided along the first wire. Therefore, even if the display wire breaks on the first wire side and the load on the display wire on the side of the first wire divided in the wire breakage decreases, the decreased load can be increased by connecting the first electrode of the spare capacitor provided along the first wire to the first wire. In this way, the load on the display wire divided in a wire breakage is adjusted to be substantially equal to the load on a normal display wire that is not broken, thus adjusting the display signal waveform to be applied to the display wire via the spare wire.

In one embodiment, the spare wire includes a first wire being on an input side of the buffer section and a second wire being on an output side of the buffer section, and the spare capacitor is provided along the second wire.

With the above configuration, the spare capacitor is provided along the second wire. Therefore, even if the display wire breaks on the second wire side and the load on the display wire on the side of the second wire divided in the wire breakage decreases, the decreased load can be increased by connecting the first electrode of the spare capacitor provided along the second wire to the second wire. In this way, the load on the display wire divided in a wire breakage is adjusted to be substantially equal to the load on a normal display wire that is not broken, thus adjusting the display signal waveform to be applied to the display wire via the spare wire.

In one embodiment, the spare wire includes a first wire being on an input side of the buffer section and a second wire being on an output side of the buffer section, and the spare capacitor is provided both on the first wire and on the second wire.

With the above configuration, where the spare capacitor is provided both on the first wire and on the second wire, even when the display wire breaks on the first wire side and the load on the broken display wire on the first wire side decreases, the decreased load can be increased by connecting the first electrode of the spare capacitor provided on the first wire and the first wire to each other. Even when the display wire breaks on the second wire side and the load on the broken display wire on the second wire decreases, the decreased load can be increased by connecting the first electrode of the spare capacitor provided on the second wire and the second wire to each other. Thus, the load on the display wire divided in a wire breakage is adjusted to be even more closely equal to the load on a normal display wire that is not broken, thus adjusting the display signal waveform to be applied to the display wire via the spare wire.

In one embodiment, the display wire is a source line to which a source signal is input.

For example, in a liquid crystal display device, the source line is a line for supplying a source signal such as a video signal to a pixel being a minimum unit of an image, and variations in the voltage of the source signal to be applied to the source line may decrease the display quality of the liquid crystal display device. However, according to the present invention, it is possible to fix a wire breakage along a display wire in such a manner that the decrease in the display quality is suppressed, irrespective of the wire breakage position. Therefore, even if the source line breaks, it is possible to fix a wire breakage along such a manner that the decrease in the display quality is suppressed, irrespective of the wire breakage position.

In one embodiment, the plurality of display wires are formed on a substrate, and the spare capacitor is provided on the substrate.

With the above configuration, the spare capacitor and the display wire are provided on the same substrate, whereby the step of connecting the display wires divided in a wire breakage and the spare wires to each other and the step of making the spare capacitors operative for the spare wires can be performed in a single step or as consecutive steps, thus making the fixing of a wire breakage more reliable. Conversely, where the spare capacitors and the display wires are provided on different substrates, the record that a display wire divided in a wire breakage and a spare wire have been connected together after detecting a wire breakage is likely to become unclear at the time when performing the step of making the spare capacitors operative, whereby the fixing of a wire breakage may be unreliable.

In one embodiment, the display device includes a display region that contributes to display and a non-display region that is provided outside the display region and that does not contribute to display, and the spare capacitor is provided in the non-display region.

With the above configuration, the spare capacitors are provided in a non-display region that has no contribution to the display, whereby it is possible to fix a wire breakage along a display wire without influencing the display quality.

In one embodiment, the first insulating film, the second insulating film and the third insulating film may be the same insulating film.

With the above configuration, the first insulating film forming the spare capacitors, the second insulating film insulating the display wires and the spare wires from each other, and the third insulating film insulating the second electrodes of the spare capacitors and the spare wires from each other can be formed by, for example, the gate insulating film for insulating the gate electrode of a thin film transistor from the semiconductor layer. Therefore, it is possible to fix a wire breakage along a display wire without adding to the process of producing the display device.

In one embodiment, the display device includes a plurality of pixels, a pixel electrode provided for each of the plurality of pixels and connected to the display wire, wherein a signal voltage is supplied to the pixel electrode, and a storage capacitor formed by the same insulating film for holding the signal voltage in the pixel electrode.

With the above configuration, the first insulating film forming the spare capacitors, the second insulating film insulating the display wires and the spare wires from each other, the third insulating film insulating the second electrodes of the spare capacitors and the spare wires from each other, and the storage capacitors for storing the signal voltage to be applied to the pixel electrode when displaying an image can be formed by, for example, the gate insulating film insulating the gate electrode of a thin film transistor from the semiconductor layer. Therefore, it is possible to fix a wire breakage along a display wire without adding to the process of producing the display device.

In one embodiment, the display device includes one spare capacitor.

With the above configuration, the first electrode of the spare capacitor is connected in advance to the spare wire and the number of the spare capacitors is one, whereby the single spare capacitor can be made operative for the broken display wire by connecting the broken display wire and the spare wire to each other. Thus, the display signal waveform to be applied to the broken display wire can be adjusted only by connecting the broken display wire and the spare wire to each other.

A display device of the present invention includes: a plurality of display wires to which display signal voltages are applied; a spare wire that can be connected to opposite ends of at least one of the plurality of display wires; and a buffer section provided along the spare wire for impedance conversion along the spare wire, wherein: the display device includes a spare capacitor for adjusting a signal waveform to be applied to the display wire with the spare wire being connected the display wire; the spare capacitor includes a first electrode and a second electrode provided so as to oppose each other, and a first insulating film interposed between the first electrode and the second electrode; one of the plurality of display wires is broken; the broken display wire and the spare wire are connected to each other; and the spare wire is connected to the first electrode.

With the above configuration, the broken display wire and the spare wire are connected to each other, whereby the display signal voltage is applied to the display wire beyond the wire breakage position via the spare wire. Since the first electrode of the spare capacitor for adjusting the display signal waveform is connected to the spare wire, the signal waveform to be applied to the broken display wire via the spare wire is adjusted. Specifically, since the first electrode of the spare capacitor is connected to the spare wire, the load on the display wire divided in a wire breakage is made substantially the same as the load on a normal display wire that is not broken, thus adjusting the signal waveform to be applied to the display wire via the spare wire. Therefore, the adjusted signal waveform is applied along the broken display wire via the spare wire, the buffer section and the spare capacitor, thereby maintaining substantially the same display quality as that of a normal display wire.

A liquid crystal display device of the present invention includes: a plurality of display wires to which display signal voltages are applied; a spare wire that can be connected to opposite ends of at least one of the plurality of display wires; and a buffer section provided along the spare wire for impedance conversion along the spare wire, wherein the liquid crystal display device includes a spare capacitor for adjusting a signal waveform to be applied to the display wire with the spare wire being connected the display wire.

A display device as described above is particularly effective in a liquid crystal display device. With a liquid crystal display device, the difference between the load on a normal source line (display wire) and the load on a source line (display wire) divided in a wire breakage has increased due to the recent increase in the resolution and the increase in the screen size, and the display quality may deteriorate due to the increase in the overshoot or undershoot.

A method of the present invention, is a method for producing a display device including: a plurality of display wires to which display signal voltages are applied; a spare wire that can be connected to opposite ends of at least one of the plurality of display wires; a buffer section provided along the spare wire for impedance conversion along the spare wire; and a spare capacitor for adjusting a signal waveform to be applied to the display wire with the spare wire being connected the display wire, wherein: the spare capacitor includes a first electrode and a second electrode provided so as to oppose each other, and a first insulating film interposed between the first electrode and the second electrode; and the first electrode of the spare capacitor is connected in advance to the spare wire, the method including: a wire breakage detecting step of detecting a presence of a wire breakage along the display wire; and a spare wire connecting step of connecting a display wire along which a wire breakage has been detected in the wire breakage detecting step and the spare wire to each other.

With the above method, the first electrode of the spare capacitor is connected in advance to the spare wire, whereby it is possible to make the spare capacitor operative for a broken display wire by connecting the broken display wire and the spare wire to each other in the spare wire connecting step. Thus, the load on the display wire divided in a wire breakage is made substantially the same as the load on a normal display wire that is not broken, thus adjusting the signal waveform to be applied to the display wire via the spare wire. Therefore, the adjusted display signal is applied to the broken display wire via the spare wire, the buffer section and the spare capacitor, thereby maintaining substantially the same display quality as that of a normal display wire. Therefore, when a display wire breaks, it is possible to fix a wire breakage along a display wire in such a manner that the decrease in the display quality is suppressed, irrespective of the wire breakage position.

In one embodiment, a plurality of spare capacitors are provided, and the method includes a cutting step of cutting off a connection between the first electrode and the spare wire for at least one of the plurality of spare capacitors.

With the above method, since there are a plurality of spare capacitors, the number of spare capacitors, which are made operative for the broken display wire by connecting the broken display wire and the spare wire to each other in the spare wire connecting step, can be reduced as necessary in the cutting step. Thus, where there are a plurality of spare capacitors provided for the spare wire, the load on the display wire divided in a wire breakage can be made substantially the same as the load on a normal display wire that is not broken by reducing the number of the spare capacitors.

In one embodiment, the method includes a wire breakage position detecting step for detecting a position of the wire breakage along the display wire detected in the wire breakage detecting step, and the cutting step cuts off the connection between the first electrode and the spare wire for a number of spare capacitors according to the wire breakage position detected in the wire breakage position detecting step.

With the above method, some of the connections between the first electrodes of the spare capacitors and the spare wire are disconnected in the cutting step according to the wire breakage position detected in the wire breakage position detecting step, whereby it is possible to fix a wire breakage along a display wire in such a manner that the decrease in the display quality is suppressed, irrespective of the wire breakage position.

Another method of the present invention is a method for producing a display device including: a plurality of display wires to which display signal voltages are applied; a spare wire that can be connected to opposite ends of at least one of the plurality of display wires; a buffer section provided along the spare wire for impedance conversion along the spare wire; and a spare capacitor for adjusting a signal waveform to be applied to the display wire with the spare wire being connected the display wire, wherein: the spare capacitor includes a first electrode and a second electrode provided so as to oppose each other, and a first insulating film interposed between the first electrode and the second electrode; and the first electrode of the spare capacitor is not connected in advance to the spare wire, the method including: a wire breakage detecting step of detecting a presence of a wire breakage along the display wire; a spare wire connecting step of connecting a display wire along which a wire breakage has been detected in the wire breakage detecting step and the spare wire to each other; and a spare capacitor connecting step of connecting the first electrode of the spare capacitor and the spare wire to each other.

With the above method, a spare capacitor can be made operative for a broken display wire by connecting the broken display wire and the spare wire to each other in the spare wire connecting step and connecting the first electrode of the spare capacitor and the spare wire to each other in the spare capacitor connecting step. Thus, the load on the display wire divided in a wire breakage is made substantially the same as the load on a normal display wire that is not broken, thus adjusting the signal waveform to be applied to the display wire via the spare wire. Therefore, the adjusted signal waveform is applied to the broken display wire via the spare wire, the buffer section and the spare capacitor, thereby maintaining substantially the same display quality as that of a normal display wire. Therefore, when a display wire breaks, it is possible to fix a wire breakage along a display wire in such a manner that the decrease in the display quality is suppressed, irrespective of the wire breakage position.

In one embodiment, the method includes a wire breakage position detecting step for detecting a position of the wire breakage along the display wire detected in the wire breakage detecting step, and the spare capacitor connecting step connects the first electrode and the spare wire to each other for a number of spare capacitors according to the wire breakage position detected in the wire breakage position detecting step.

With the above method, the first electrode of the spare capacitor and the spare wire are connected to each other in the spare capacitor connecting step according to the wire breakage position detected in the wire breakage position detecting step, whereby it is possible to fix a wire breakage along a display wire in such a manner that the decrease in the display quality is suppressed, irrespective of the wire breakage position.

According to the present invention, a spare capacitor for adjusting the signal waveform to be applied to a broken display wire is provided along a spare wire, whereby when one of a plurality of display wires breaks, the broken display wire and the spare wire can be connected to each other and the spare capacitor can be made operative as necessary according to the wire breakage position, thereby applying an adjusted signal waveform to the display wire divided in a wire breakage via the spare wire and the spare capacitor. Thus, it is possible to fix a wire breakage along a display wire in such a manner that the decrease in the display quality is suppressed, irrespective of the wire breakage position along the display wire.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Embodiments of the present invention will now be described in detail with reference to the drawings. In the following embodiment, a liquid crystal display device is used as a display device of the present invention, and a source line is used as a display wire of which a wire breakage is to be fixed. However, the present invention is not limited to this.

Embodiment 1

A liquid crystal display device 50 according to Embodiment 1 of the present invention will now be described.

Figure 1:
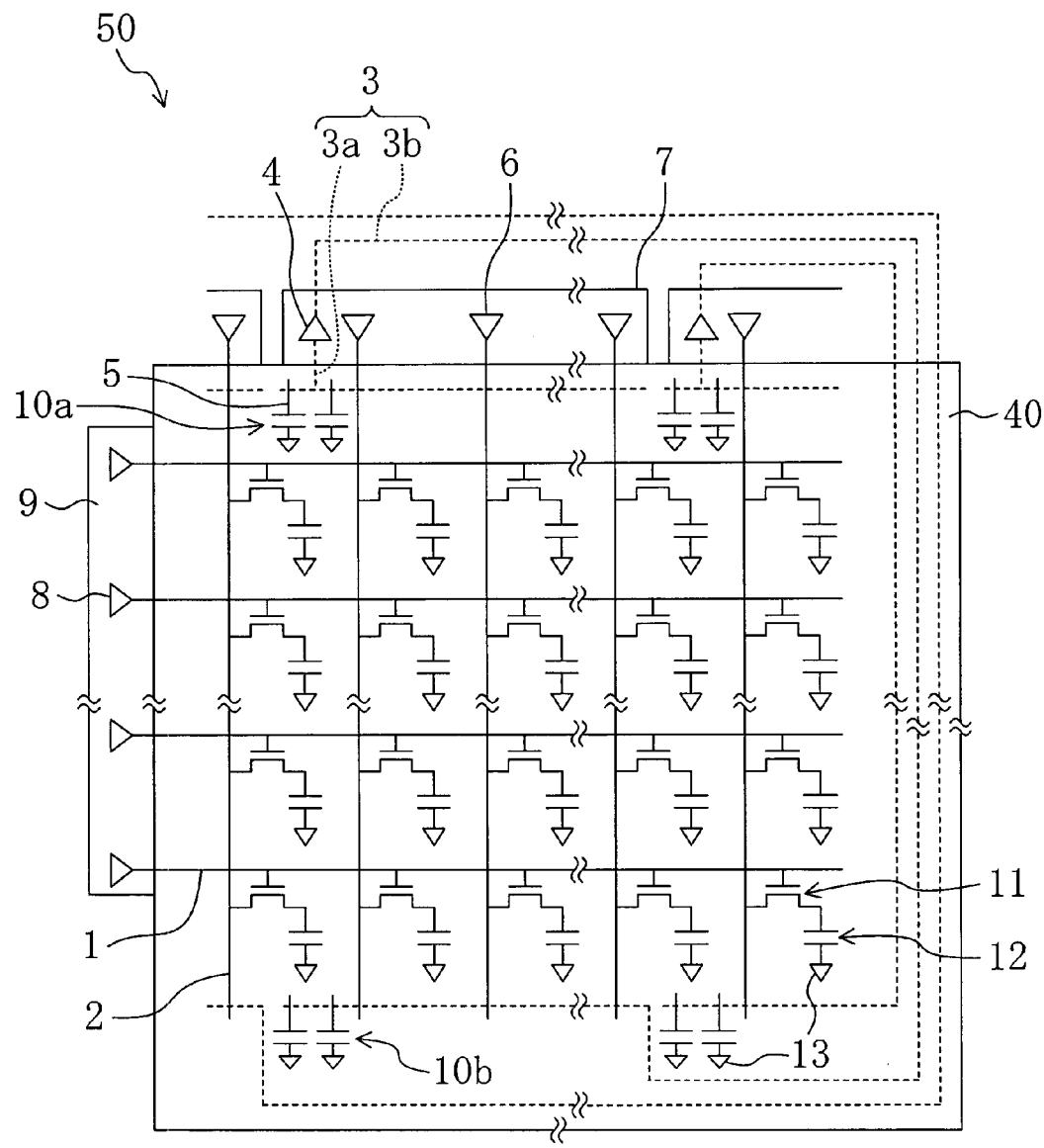
FIG. 1 is an equivalent circuit diagram showing a liquid crystal display device according to Embodiment 1 of the present invention.
Figure 2:
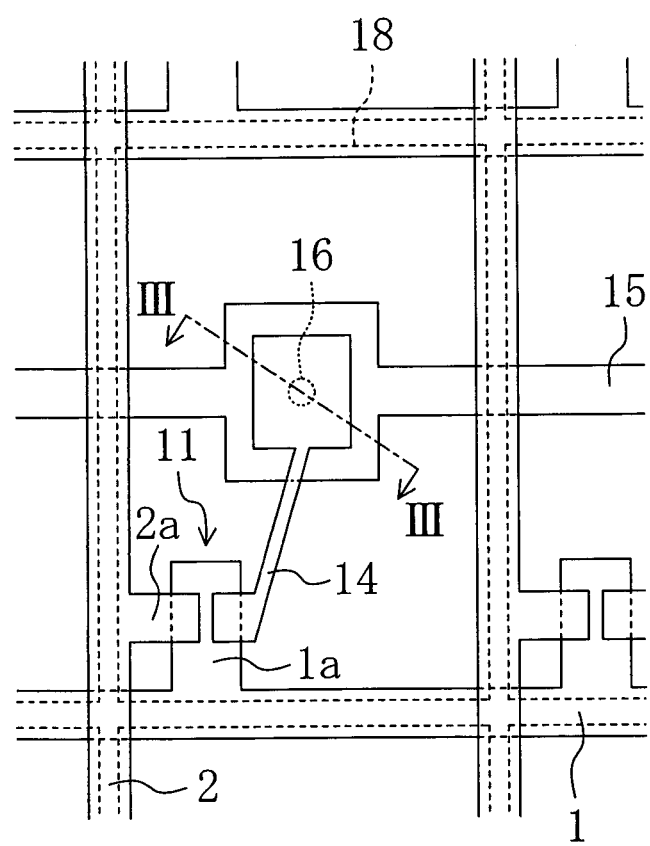
FIG. 2 is a plan view showing a single pixel of a liquid crystal display device according to Embodiment 1 of the present invention.
Figure 3:
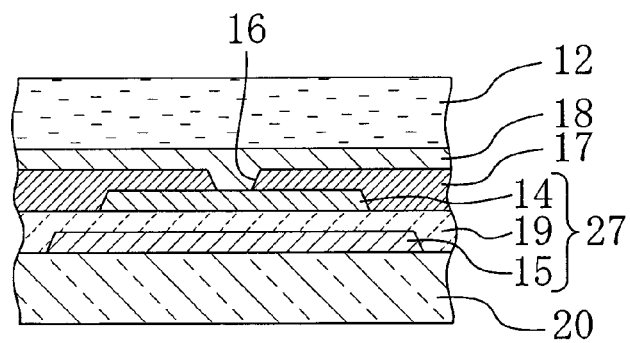
FIG. 3 is a cross-sectional view taken along line III-III of FIG. 2.

FIG. 1 is an equivalent circuit diagram showing the liquid crystal display device 50 according to Embodiment 1 of the present invention. FIG. 2 is a plan view showing a single pixel of the liquid crystal display device 50, and FIG. 3 is a cross-sectional view taken along line III-III of FIG. 2.

The liquid crystal display device 50 includes a liquid crystal display panel 40, a gate driver 9 provided along the left side of the liquid crystal display panel 40, and a source driver 7 provided along the upper side of the liquid crystal display panel 40.

The liquid crystal display panel 40 includes an active matrix substrate, a counter substrate provided so as to oppose the active matrix substrate, and a liquid crystal layer 12 interposed between the substrates.

The active matrix substrate includes, on a glass substrate 20, a plurality of gate lines 1 extending in parallel to one another and in the horizontal direction in FIG. 1, and a plurality of source lines 2 (display wires) extending perpendicular to the gate lines 1 and in the vertical direction in FIG. 1. Although not shown in FIG. 1, capacitor lines 15 are provided so as to extend in parallel to one another between the gate lines 1 as shown in FIG. 2. A thin film transistor (TFT) 11, being a switching element, is provided at each intersection between the gate line 1 and the source line 2.

Each region delimited by a pair of adjacent gate lines 1 and a pair of adjacent source lines 2 forms a pixel, being the minimum unit of an image. Pixel electrodes 18 are formed along the gate lines 1 and the source lines 2, each corresponding to one pixel, so as to form a matrix pattern. The pixel electrodes 18 arranged in a matrix pattern together form the display region.

As shown in FIG. 2, a TFT 11 includes a gate electrode 1a extending sideways from the gate line 1, a gate insulating film 19 provided so as to cover the gate electrode 1a, a source electrode 2a provided on the gate insulating film 19 and protruding sideways from the source line 2, and a drain electrode 14 provided also on the gate insulating film 19 so as to oppose the source electrode 2a.

The drain electrode 14 is extended to a region where the capacitor line 15 is provided, and a storage capacitor 27 is formed by the extended portion, the capacitor line 15 and the gate insulating film 19 interposed therebetween.

A protection film 17 is provided so as to cover the source electrode 2a and the drain electrode 14. The pixel electrodes 18 are provided on the protection film 17. The pixel electrode 18 is connected to the drain electrode 14 via a contact hole 16 formed in the protection film 17. An alignment film (not shown) is provided on the pixel electrode 18.

The gate lines 1 are extended to a non-display region of the active matrix substrate (the left side of the liquid crystal display panel 40) outside the display region, where the gate lines 1 are connected to output amplifiers 8 in the gate driver 9.

The source lines 2 are extended to a non-display region of the active matrix substrate (the upper side of the liquid crystal display panel 40), where the source lines 2 are connected to output amplifiers 6 in the source driver 7.

Moreover, a buffer section 4 is provided in the source driver 7, wherein the buffer section 4 functions as an impedance conversion amplifier in a spare wire 3 including a first wire 3a and a second wire 3b to be described later.

Furthermore, in a non-display region of the active matrix substrate (an area along the upper side of the liquid crystal display panel 40), the first wire 3a for fixing a wire breakage is provided so as to extend perpendicular to the source lines 2 via the gate insulating film 19 (the second insulating film) therebetween, with one end thereof being connected to the input side of the buffer section 4. In a non-display region of the active matrix substrate (an area along the lower side of the liquid crystal display panel 40), the second wire 3b for fixing a wire breakage is provided so as to extend perpendicular to the source lines 2 via the gate insulating film 19 (the second insulating film) therebetween, with one end thereof being connected to the output side of the buffer section 4 via a non-display region of the active matrix substrate (an area along the right side and the upper side of the liquid crystal display panel 40).

A plurality of first spare capacitors 10a and a plurality of second spare capacitors 10b are provided so that they can be connected to the first wire 3a and the second wire 3b, respectively.

Figure 5:
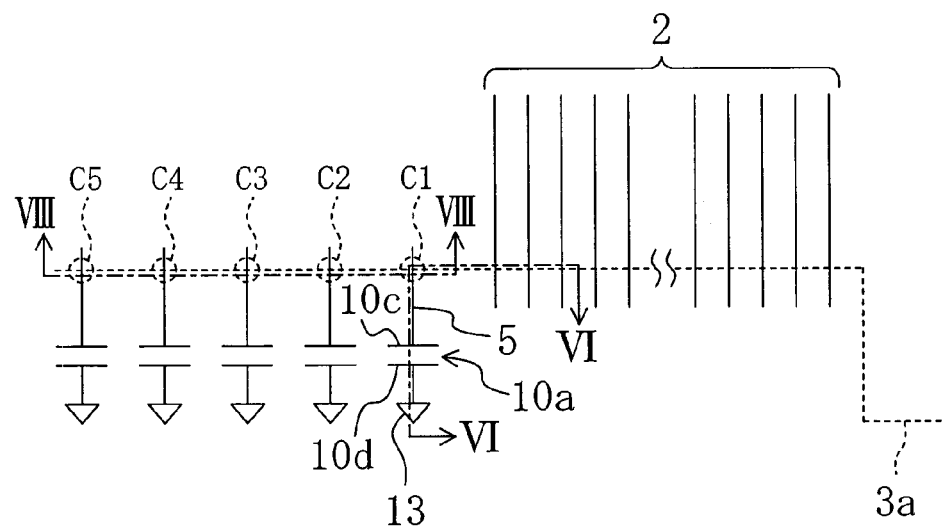
FIG. 5 is an equivalent circuit diagram showing a spare capacitor of a liquid crystal display device according to Embodiment 1 of the present invention.

For example, five first spare capacitors 10a are provided so that they can be connected to the first wire 3a, as shown in FIG. 5.

Figure 6:
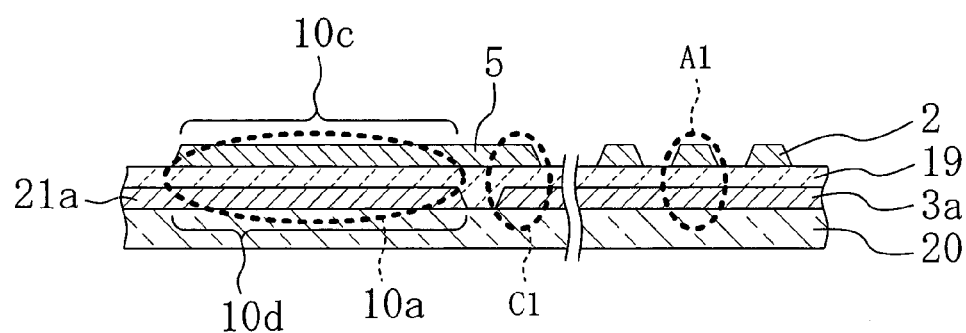
FIG. 6 is a cross-sectional view taken along line VI-VI of FIG. 5.

As shown in FIG. 6, the first spare capacitor 10a includes a first electrode 10c and a second electrode 10d provided so as to oppose each other, and the gate insulating film 19 (the first insulating film) interposed between the first electrode 10c and the second electrode 10d. Note that FIG. 6 is a cross-sectional view taken along line VI-VI of FIG. 5.

The first electrode 10c is an extended portion of a spare capacitor connection wire 5, which is provided over the first wire 3a via the gate insulating film 19 (the third insulating film) therebetween. Thus, since the gate insulating film 19 is interposed between the first electrode 10c of the first spare capacitor 10a and the first wire 3a, the first electrode 10c of the first spare capacitor 10a is not connected in advance to the first wire 3a of the spare wire 3.

The spare capacitor connection wires 5 are provided so as to extend perpendicular to the first wire 3a via the gate insulating film 19 (the third insulating film) therebetween as described above, and they intersect at intersections C1 to C5 as shown in FIGS. 5 and 6.

Figure 4:
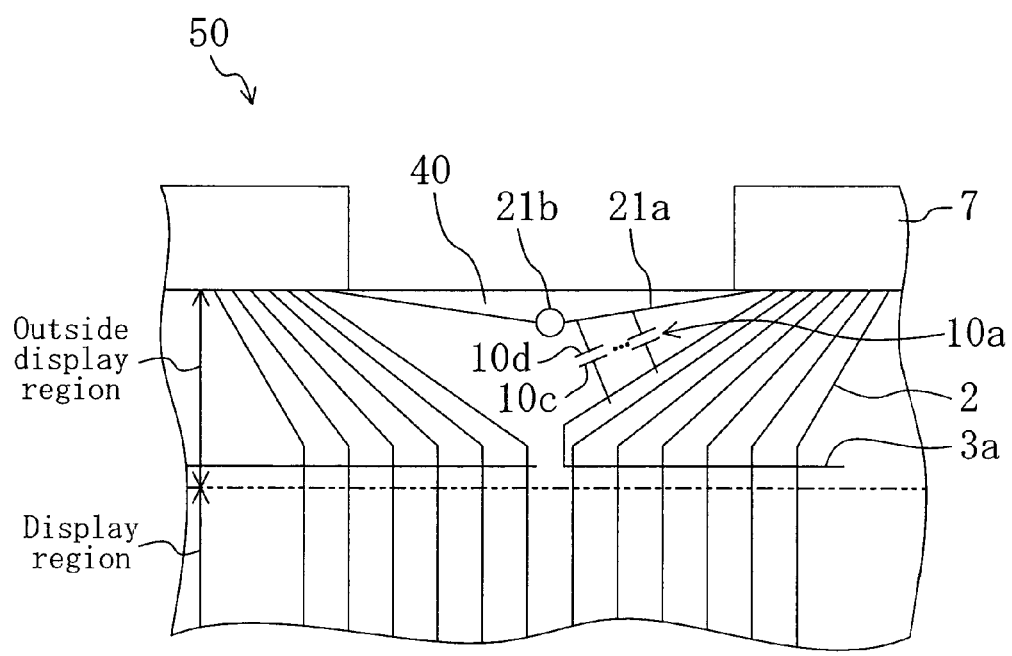
FIG. 4 is a plan view showing a spare capacitor of a liquid crystal display device according to Embodiment 1 of the present invention.

As shown in FIG. 4, the second electrode 10d is an extended portion of a common electrode wire 21a that is connected to a common electrode 13 of the counter substrate to be described later via a common electrode transition point 21b. Note that while the second electrode 10d is connected to the common electrode 13 in the present embodiment, the second electrode 10d may be connected to the capacitor line 15 or grounded.

The second spare capacitor 10b is similarly configured to the first spare capacitor 10a, except that the second spare capacitor 10b is located in an area along the lower side of the liquid crystal display panel 40. Therefore, the second spare capacitor 10b will not be further described below.

The sum of the magnitudes of the capacitances of the spare capacitors 10a and 10b provided along a single spare wire 3 (the first wire 3a and the second wire 3b) is preferably about the same as, or slightly smaller than, the magnitude of the total capacitance of the parasitic capacitance to be the load on a single source line 2.

Although not shown in the figure, the counter substrate has a multi-layer structure including a color filter layer, an overcoat layer, the common electrode 13 and an alignment film being layered in this order on a glass substrate.

The color filter layer is provided with one of a red, green and blue colored layer for each pixel and with a black matrix as a light-blocking film between the colored layers.

The liquid crystal layer 12 includes a nematic liquid crystal material having electro-optical characteristics.

In each pixel of the liquid crystal display device 50 having such a configuration, a signal voltage according to the gate signal from the output amplifier 8 in the gate driver 9 is applied to the TFT 11 via the gate line 1 and the gate electrode 1a, thereby turning ON the TFT 11, and at the same time, a signal voltage according to the source signal (video signal) from the output amplifier 6 in the source driver 7 is applied to the pixel electrode 18 via the source line 2, the source electrode 2a and the drain electrode 14, thereby writing a predetermined charge to the pixel electrode 18. Then, there occurs a potential difference between the pixel electrode 18 and the common electrode 13, and a predetermined voltage is applied to the liquid crystal capacitor being the liquid crystal layer 12 and the storage capacitor 27. Then, with the liquid crystal display device 50, the transmittance of light coming from outside is adjusted based on the mechanism where the orientation of liquid crystal molecules changes according to the magnitude of the applied voltage, thereby displaying an image.

The storage capacitor 27 is provided in parallel to the liquid crystal capacitor so as to suppress the amount of variation in the voltage applied to the liquid crystal capacitor being the liquid crystal layer 12. Note that the liquid crystal display panel of the present embodiment has a "Cs on Common" configuration. The magnitude of the capacitance of the storage capacitor 27 depends on the thickness, the dielectric constant and the area of the gate insulating film 19, and is about 100 to 200 pF/mm$^2$ with an ordinary 15' XGA (1024× RGB×768) liquid crystal display panel.

A method for producing the liquid crystal display device 50 according to Embodiment 1 of the present invention will now be described by way of an example.

The liquid crystal display device 50 according to Embodiment 1 of the present invention is produced through an active matrix substrate production step, a counter substrate production step, a liquid crystal display panel production step, an inspection step and a driver mounting step to be described below, wherein a wire breakage fixing step is performed after the inspection step if a wire breakage is detected in the inspection step.

Active Matrix Substrate Production Step

The active matrix substrate production step will now be described.

First, a metal film made of Ta, a TaMo alloy, or the like (thickness: 1000 to 2000 Å) is deposited by a sputtering method entirely across the substrate on the glass substrate 20, and is then patterned by a photolithography technique (Photo Engraving Process; hereinafter referred to as the "PEP technique") to thereby form the gate lines 1, the gate electrodes 1a, the capacitor lines 15, the first wires 3a, the second wires 3b, and the common electrode wires 21a (the second electrodes 10d).

Then, a silicon nitride film (thickness: about 400 nm), or the like, is deposited by a CVD (Chemical Vapor Deposition) method entirely across the substrate on which the gate lines 1, etc., have been formed to thereby form the gate insulating film 19.

Then, an intrinsic amorphous silicon film (thickness: about 150 nm) and a phosphorus-doped n+ amorphous silicon film (thickness: about 50 nm) are deposited successively by a CVD method entirely across the substrate on the gate insulating film 19, and are patterned into an island-like pattern on the gate electrode 1a by the PEP technique to thereby form a semiconductor layer including an intrinsic amorphous silicon layer and an n+ amorphous silicon layer.

Then, a metal film (thickness: 1000 to 2000 Å) made of Ti, or the like, is deposited by a sputtering method entirely across the substrate on which the semiconductor layer has been formed, and is patterned by the PEP technique to thereby form the source lines 2, the source electrodes 2a, the drain electrodes 14 and the spare capacitor connection wires 5 (the first electrodes 10c).

While the semiconductor layer may be an amorphous silicon film as described above, a polysilicon film may be deposited alternatively, and the amorphous silicon film and the polysilicon film may be subjected to a laser annealing process to improve the crystallinity. Then, the traveling speed of electrons through the semiconductor layer is increased, and the characteristics of the TFT 11 can be improved.

Furthermore, a silicon nitride film (thickness: about 3000 Å), or the like, is deposited by a CVD method entirely across the substrate on which the source line 2, etc., have been formed to thereby form the protection film 17.

Then, portions of the protection film 17 corresponding to the drain electrodes 14 are etched away to form the contact holes 16.

Then, a transparent conductive film (thickness: about 1000 Å) being an ITO (Indium Tin Oxide) film is deposited by a sputtering method entirely across the substrate on the protection film 17, and is then patterned by the PEP technique to thereby form the pixel electrodes 18.

Finally, a polyimide resin is printed to a thickness of 500 to 1000 Å entirely across the substrate on the pixel electrode 18, after which the substrate is baked and subjected to a rubbing treatment in one direction with a spinning cloth to thereby form an alignment film.

The active matrix substrate is produced as described above.
Counter Substrate Production Step The counter substrate production step will now be described.

First, a Cr thin film or a resin containing a black pigment is deposited on a glass substrate, and is then patterned by the PEP technique to thereby form a black matrix.

One of a red, green and blue colored layer (thickness: about 2 μm) is formed between portions of the black matrix by patterning using a pigment dispersion method, or the like, to thereby form a color filter layer.

Then, an acrylic resin is applied entirely across the substrate on the color filter layer to thereby form an overcoat layer.

Then, an ITO film (thickness: about 1000 Å) is deposited entirely across the substrate on the overcoat layer to thereby form the common electrodes 13.

Finally, a polyimide resin is printed to a thickness of 500 to 1000 Å entirely across the substrate on the common electrode 13, after which the substrate is baked and subjected to a rubbing treatment in one direction with a spinning cloth to thereby form an alignment film.

The counter substrate can be produced as described above.
Liquid Crystal Display Panel Production Step The liquid crystal display panel production step will now be described.

First, a sealant material such as a thermosetting epoxy resin is applied by screen printing on one of the active matrix substrate and the counter substrate produced as described above in a frame-shaped pattern in which no sealant material is applied in a portion corresponding to the liquid crystal injection port, and spherical spacers made of a plastic or silica material having a diameter corresponding to the thickness of the liquid crystal layer 12 are dispersed across the other one of the substrates.

Then, the active matrix substrate and the counter substrate are attached together, and the sealant material is allowed to cure to thereby produce an empty liquid crystal display panel.

Finally, a liquid crystal material is injected into the empty liquid crystal display panel by a dipping method, after which a UV-setting resin is applied to the liquid crystal injection port and the liquid crystal material is sealed by UV radiation. Thus, the liquid crystal layer 12 is formed.

The liquid crystal display panel 40 is produced as described above.
Inspection Step (Wire Breakage Detecting Step and Wire Breakage Position Detecting Step)

The inspection step for the liquid crystal display panel 40 produced as described above will now be described.

For example, a gate inspection signal is input to each gate line 1 to thereby turn ON all the TFTs 11, wherein the gate inspection signal is a +15 V pulse voltage, of which the bias voltage is −10 V, the period is 16.7 msec and the pulse width is 50 μsec. Furthermore, a source inspection signal whose potential is ±2 V and whose polarity is inverted every 16.7 msec is input to each source line 2, whereby a charge corresponding to ±2 V is written to the pixel electrode 18 via the source electrode 2a and the drain electrode 14 of each TFT 11. At the same time, a common electrode inspection signal which is a direct current and whose potential is −1 V is input to the common electrode 13.

Then, a voltage is applied to the liquid crystal capacitor between each pixel electrode 18 and the common electrode 13 to light a pixel being formed by the pixel electrode 18, whereby the pixel transitions from white to black in a normally white mode (where white is displayed in the absence of an applied voltage).

Figure 7:
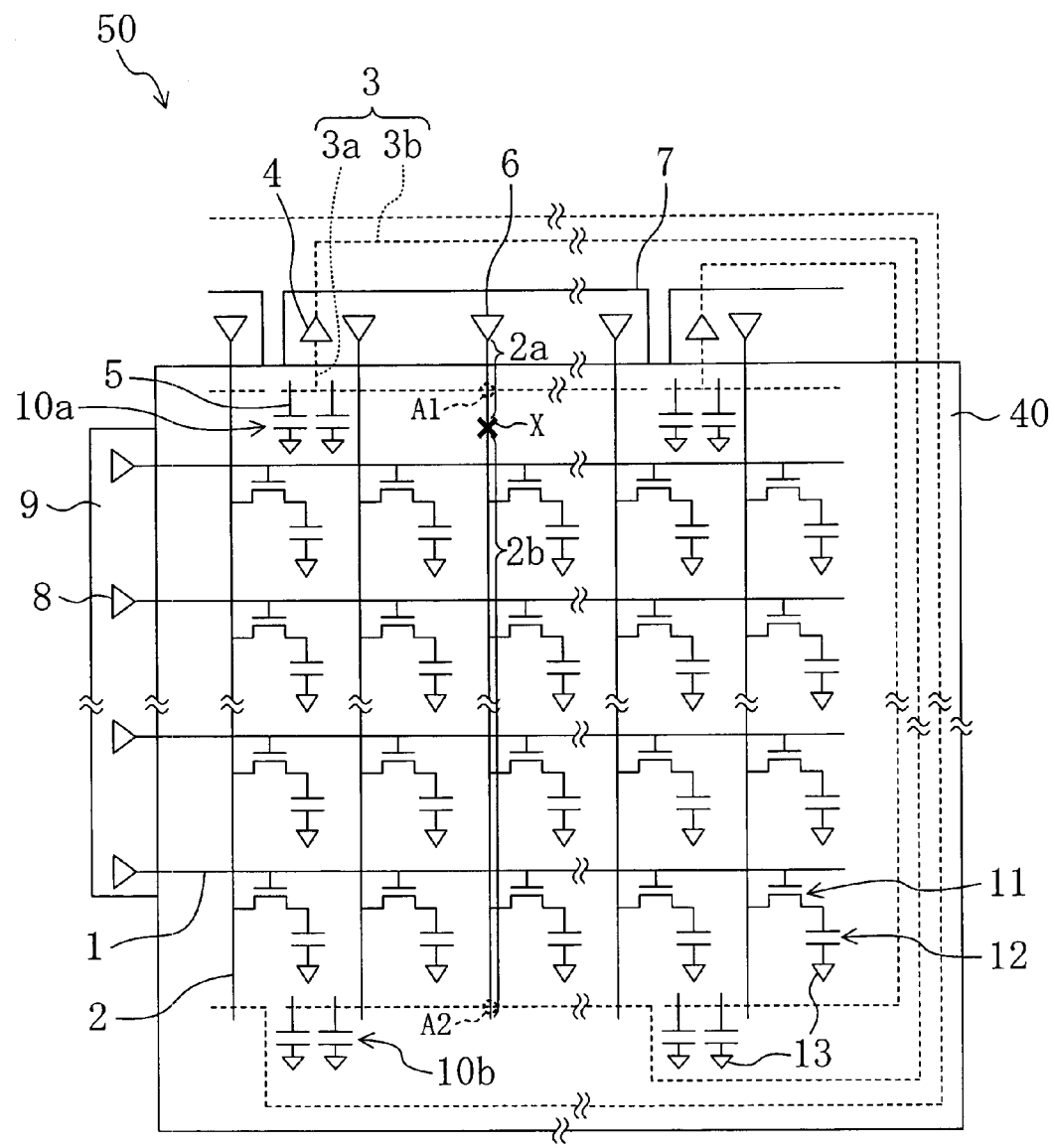
FIG. 7 is an equivalent circuit diagram showing a liquid crystal display device according to Embodiment 1 of the present invention, wherein a source line and a spare wire are connected to each other.

In a pixel along a source line where a wire breakage has occurred, a predetermined charge cannot be written to the pixel electrode 18, whereby the pixel is not lit (a "bright dot"). Thus, a wire breakage position X of the source line 2 is detected as shown in FIG. 7.
Wire Breakage Fixing Step The wire breakage fixing step includes a spare wire connecting step and a spare capacitor connecting step to be described below.
Spare Wire Connecting Step The spare wire connecting step will now be described.

Both an intersection A1 between a source line 2a broken at the wire breakage position X and a spare wire 3a and an intersection A2 between a source line 2b broken at the wire breakage position X and a spare wire 3b are irradiated with a light energy such as laser light from the glass substrate 20 to thereby make a contact hole in the gate insulating film 19 at the intersections. Thus, the broken source lines 2a and 2b are connected to the spare wires 3 (the first wire 3a and the second wire 3b), whereby a signal voltage according to the source signal is applied to the source line 2b beyond the wire breakage position X via the first wire 3a, the buffer section 4 and the second wire 3b.
Spare Capacitor Connecting Step The spare capacitor connecting step will now be described.

Since the wire breakage position X is located closer to the source driver 7, the load on the source line 2b below the wire breakage position X is not significantly different from the load on a normal source line 2 that is not broken, and therefore the second wire 3b forming the spare wire and the first electrode 10c of the second spare capacitor 10b are not connected together. On the other hand, the load on the source line 2a above the wire breakage position X is significantly smaller than the load on a normal source line 2, and therefore the first wire 3*a* forming the spare wire and the first electrode 10*c* of the first spare capacitor 10*a* are connected together so that the load on the source line 2*a* above the wire breakage position X is substantially the same as the load on a normal source line 2.

Figure 8:
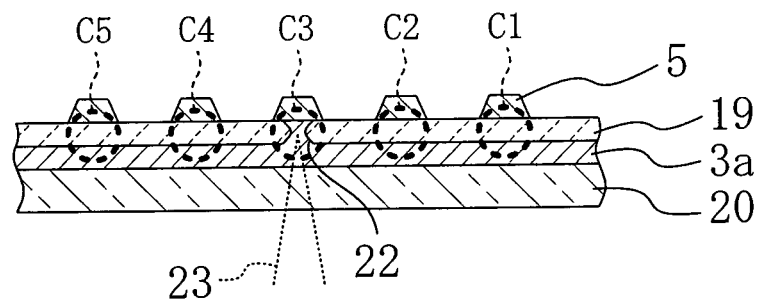
FIG. 8 is a cross-sectional view showing a liquid crystal display device according to Embodiment 1 of the present invention, wherein a spare wire and a spare capacitor are connected to each other.

Specifically, at least one of intersections C1 to C5 shown in FIG. 5 is irradiated with a light energy 23 such as laser light from the side of the glass substrate 20 as shown in FIG. 8 to thereby destroy the gate insulating film 19, thus forming a contact hole 22 in the irradiated portion of the gate insulating film 19. Thus, the first wire 3*a* and the spare capacitor connection wire 5 are connected together. Note that FIG. 8 is a cross-sectional view taken along line VIII-VIII of FIG. 5, showing the contact hole 22 being formed at the intersection C3.

In this way, the first spare capacitor 10*a* can be connected to the source line 2*a*, which has broken in a wire breakage. Therefore, the load on the source line 2*a* divided in a wire breakage is substantially equal to the load on a normal source line 2, thus adjusting the signal waveform to be applied to the source line 2*a*.

Figure 16:
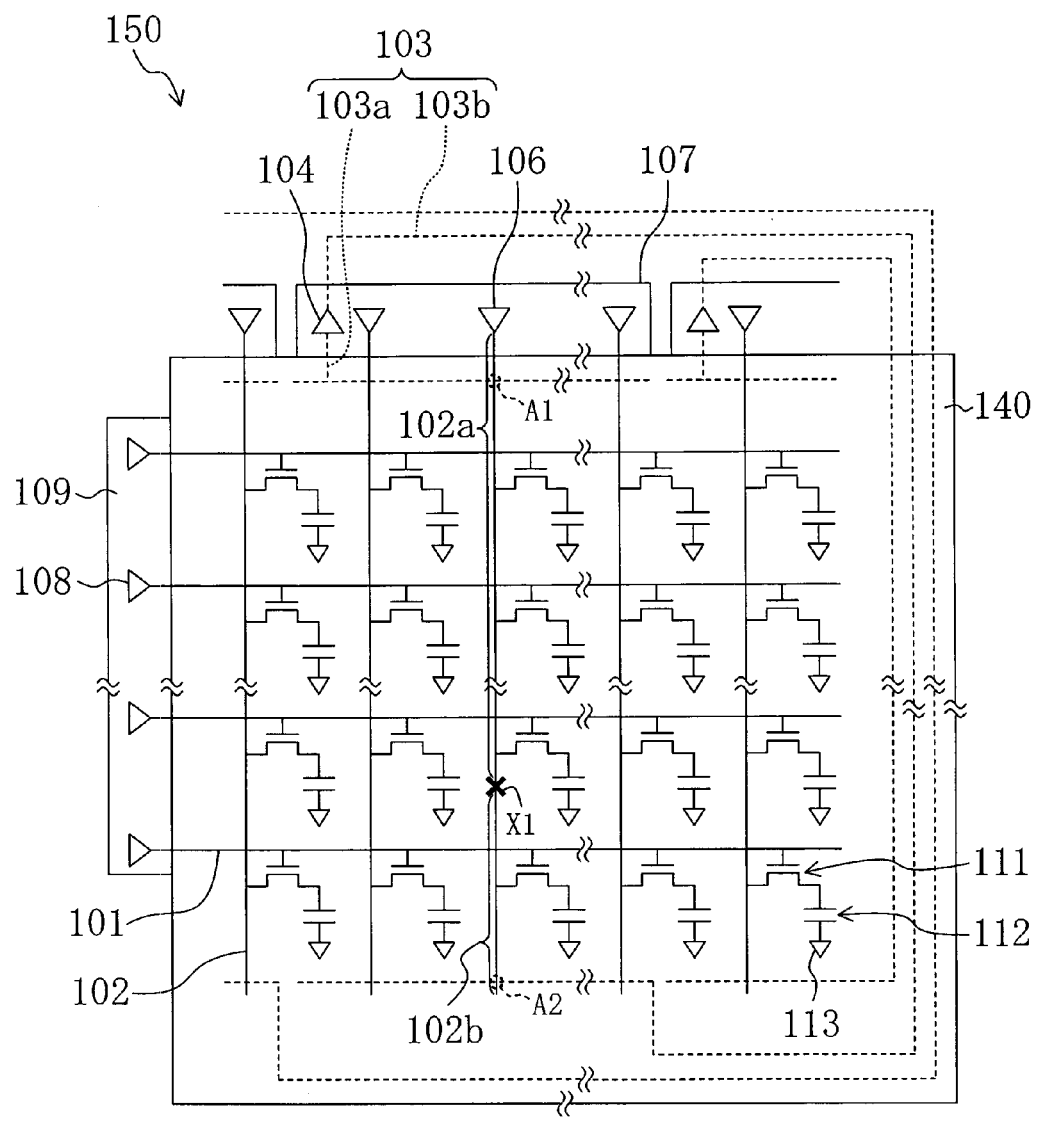
FIG. 16 is an equivalent circuit diagram showing a conventional liquid crystal display device where a source line and a spare wire are connected to each other, due to a wire breakage of a source line on the opposite side to the source driver.
Figure 17:
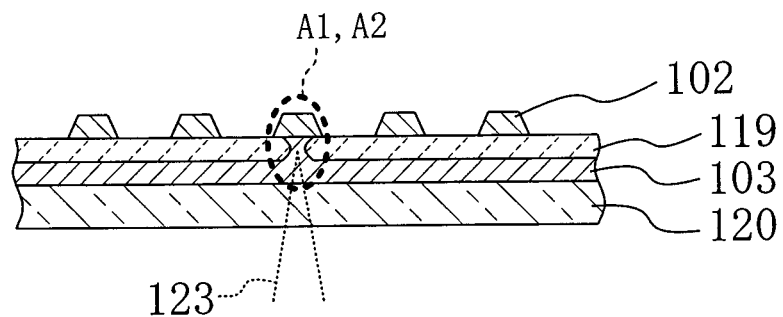
FIG. 17 is a cross-sectional view showing a conventional liquid crystal display device in which a source line and a spare wire are connected to each other.
Figure 18:
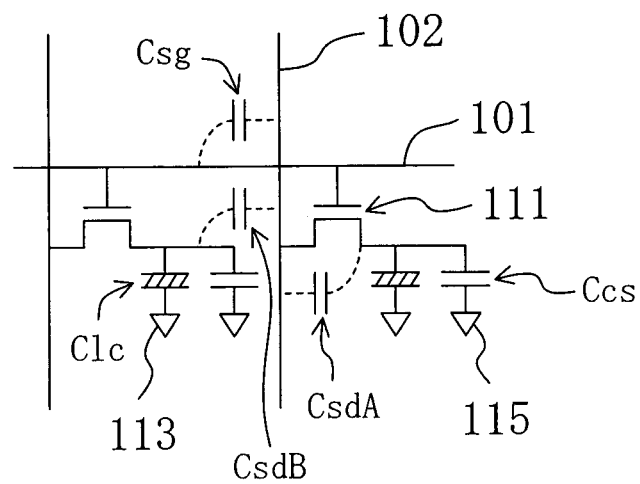
FIG. 18 is an equivalent circuit diagram showing a capacitance of a source line of a conventional liquid crystal display device.
Figure 19:
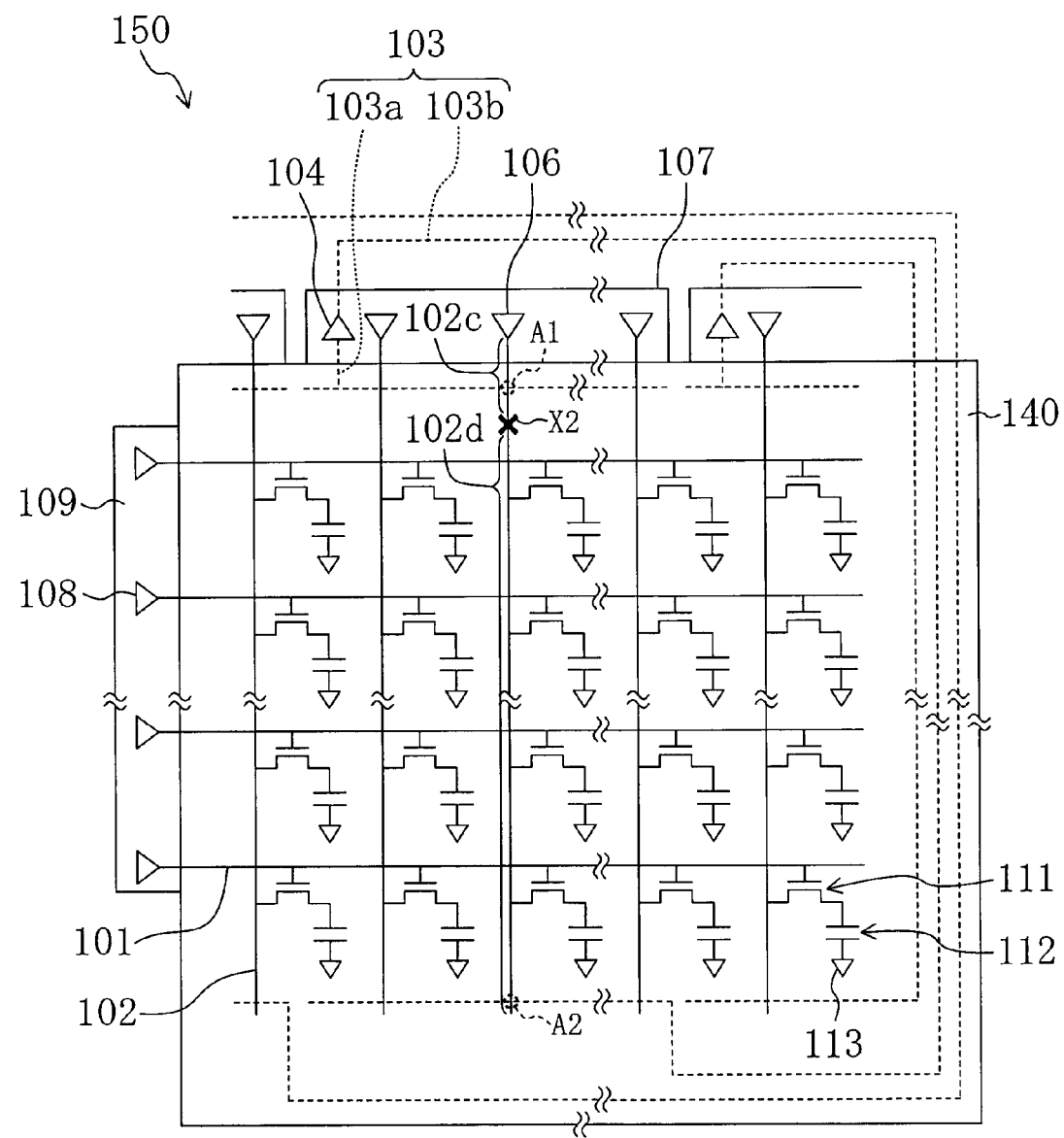
FIG. 19 is an equivalent circuit diagram showing a conventional liquid crystal display device in which a source line and a spare wire are connected to each other, due to a wire breakage of a source line on the source driver side.
Figure 20:
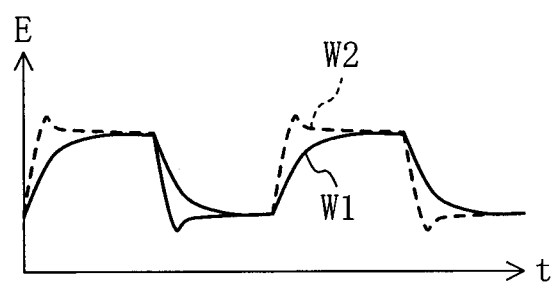
FIG. 20 is a waveform diagram showing a waveform of a source line and that of a spare wire for a conventional liquid crystal display device.

When the source line 2 breaks at a position remote from the source driver 7 such as the wire breakage position X1 in FIG. 16 as used in the BACKGROUND ART section, the load on the source line 2 above the wire breakage position (X1) is not significantly different from the load on a normal source line 2 that is not broken, as opposed to a case with the wire breakage position X described above, and therefore the first wire 3*a* forming the spare wire and the first electrode 10*c* of the first spare capacitor 10*a* are not connected together. On the other hand, the load on the source line 2 below the wire breakage position (X1) is significantly smaller than the load on a normal source line 2, and therefore the second wire 3*b* forming the spare wire and the first electrode 10*c* of the second spare capacitor 10*b* are connected together so that the load on the source line 2 below the wire breakage position (X1) is substantially the same as the load on a normal source line 2.

The number of the first spare capacitors 10*a* and the number of the second spare capacitors 10*b* to be made to function for the first wire 3*a* and the second wire 3*b*, respectively, of the spare wire 3 will now be discussed.

Figure 9:
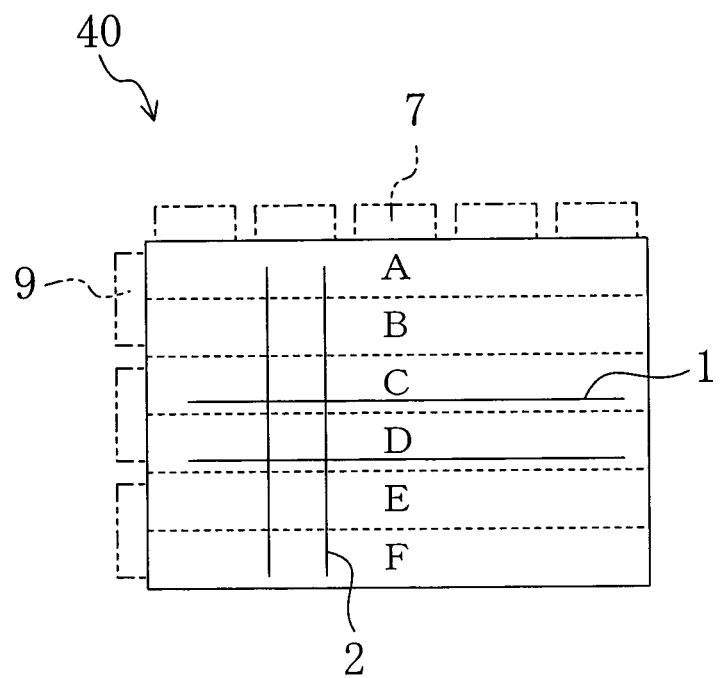
FIG. 9 is a plan view showing a typical liquid crystal display device.

FIG. 9 is a schematic diagram showing the liquid crystal display panel 40 being divided into six equal regions A to F along the source lines 2.

It is preferred that the number of regions into which the liquid crystal display panel 40 is equally divided is the number of the first spare capacitors 10*a* (the second spare capacitors 10*b*) plus one. In the present embodiment, the whole region is divided into six equal regions since there are five first spare capacitors 10*a*.

Schemes for connecting the first spare capacitors 10*a* and the second spare capacitors 10*b* for specific wire breakage positions will now be described.

(a) Where the source line 2 breaks in the region A, five first spare capacitors 10*a* are connected to the first wire 3*a* and no second spare capacitor 10*b* is connected to the second wire 3*b*.

(b) Where the source line 2 breaks in the region B, four first spare capacitors 10*a* are connected to the first wire 3*a* and one second spare capacitor 10*b* is connected to the second wire 3*b*.

(c) Where the source line 2 breaks in the region C, three first spare capacitors 10*a* are connected to the first wire 3*a* and two second spare capacitors 10*b* are connected to the second wire 3*b*.

(d) Where the source line 2 breaks in the region D, two first spare capacitors 10*a* are connected to the first wire 3*a* and three second spare capacitors 10*b* are connected to the second wire 3*b*.

(e) Where the source line 2 breaks in the region E, one first spare capacitor 10*a* is connected to the first wire 3*a* and four second spare capacitors 10*b* are connected to the second wire 3*b*.

(f) Where the source line 2 breaks in the region F, no first spare capacitor 10*a* is connected to the first wire 3*a* and five second spare capacitors 10*b* are connected to the second wire 3*b*.

Where the magnitude of the parasitic capacitance to be the load on a single source line 2 is 120 pF, the magnitude of the capacitance of each first spare capacitor 10*a* (second spare capacitor 10*b*) may be set to be about 20 pF. Then, no matter where in the source line 2 a wire breakage occurs, the load on the source line divided in a wire breakage can be made substantially equal to the load on a normal source line 2 that is not broken, thus adjusting the signal waveform according to the source signal to be applied to the source line 2 via the spare wire 3, by performing one of the connection schemes (a) to (f). Therefore, along a broken source line, the adjusted signal waveform is applied via the spare wires (the first wire 3*a* and the second wire 3*b*), the buffer section 4 and the spare capacitors (10*a* and 10*b*), and the waveform on the spare wire will not overshoot or undershoot as is the case with conventional techniques, thus maintaining a display quality substantially the same as that of a normal source line 2. Thus, wire breakages of the source line 2 are fixed, to thereby produce the liquid crystal display panel 40 in which wire breakages are fixed.

Not only the source line 2 but also the spare wire 3 (the first wire 3*a* and the second wire 3*b*) has a slight parasitic capacitance. Therefore, the total of the magnitudes of the capacitances of a first spare capacitor 10*a* and a second spare capacitor 10*b* is preferably equal to the magnitude of the parasitic capacitance to be the load on a single normal source line 2 minus the magnitudes of the parasitic capacitances on the first wire 3*a* and the second wire 3*b*.

The above example shows a case where five first spare capacitors 10*a* and five second spare capacitors 10*b* are connected to the first wire 3*a* and the second wire 3*b*, respectively, of the spare wire 3. In a case where there are one first spare capacitor 10*a* and one second spare capacitor 10*b*, the spare capacitors can be connected appropriately as described above after dividing the liquid crystal display panel 40 into two regions.

Driver Mounting Step

The driver mounting step will now be described.

The gate driver 9 and the source driver 7 are mounted on a liquid crystal display panel 40 that has been proven to be non-defective in the inspection step or a liquid crystal display panel 40 that has been made non-defective by fixing a wire breakage in the wire breakage fixing step.

The liquid crystal display device 50 of the present invention is produced as described above.

Figure 10:
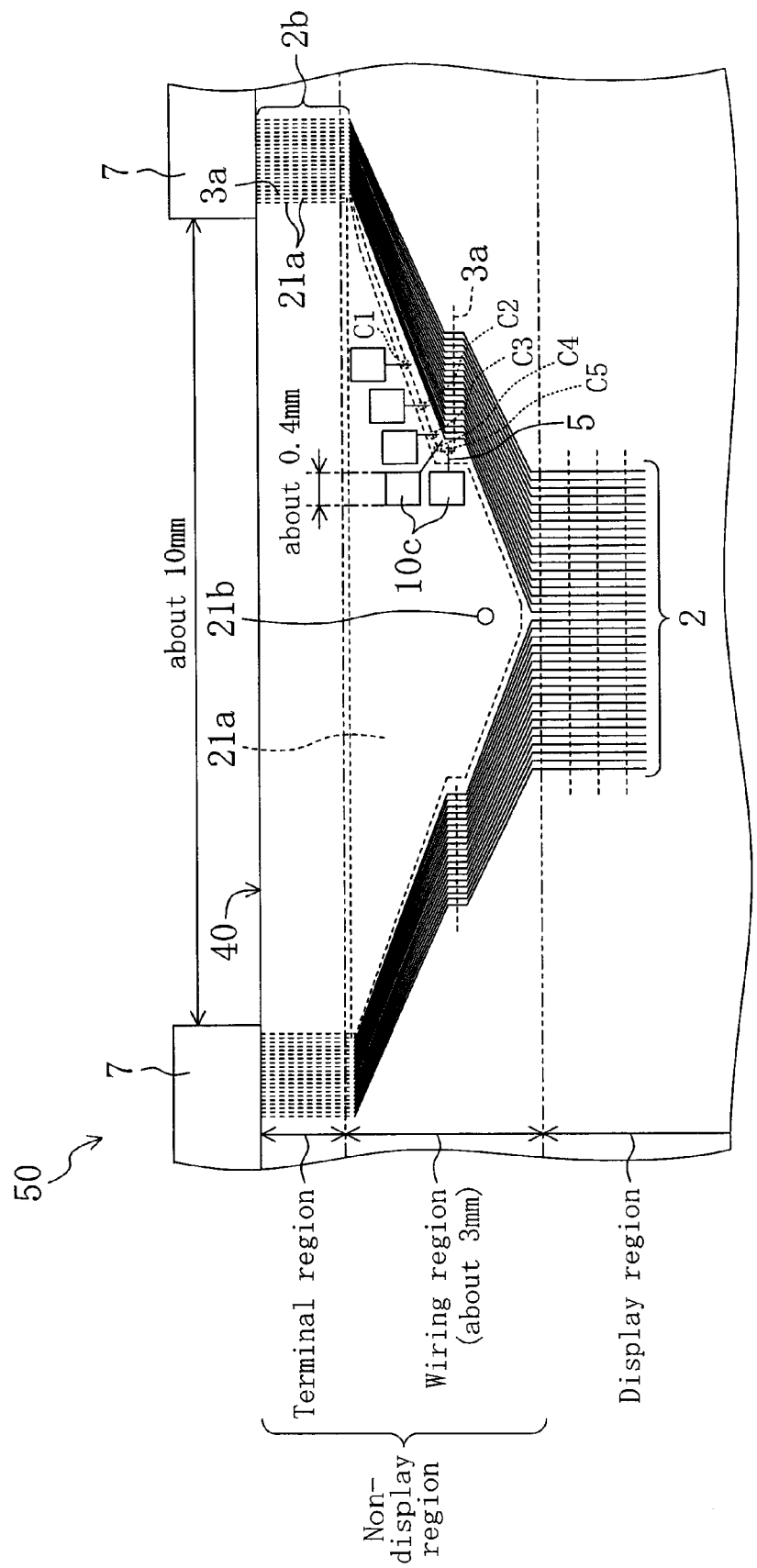
FIG. 10 is a plan view showing in detail a spare capacitor of a liquid crystal display device according to Embodiment 1 of the present invention.

FIG. 10 is a plan view showing in greater detail a region of the liquid crystal display device 50 of the present embodiment where spare capacitors are located. Specifically, the figure is a plan view of a portion between the source drivers 7, showing an application of the configuration of the present invention to a 15' XGA (1024×RGB×768) liquid crystal display panel.

In the liquid crystal display device 50, the number of output amplifiers 6 in one source driver 7, i.e., the number of outputs of the source driver 7, is 384, and eight source drivers 7 are mounted. In such a case, the distance between source drivers 7 is about 10 mm and the wiring region is about 3 mm as shown in FIG. 10.

The parasitic capacitance of a single source line 2 in an ordinary 15' XGA (1024×RGB×768) liquid crystal display panel is about 100 pF. Therefore, assuming that the parasitic capacitance of a single source line 2 is 120 pF, and that five spare capacitors 10a are provided for each first wire 3a, the magnitude of the optimal capacitance per spare capacitor 10a is 20 pF.

With an ordinary 15' XGA (1024×RGB×768) liquid crystal display panel, the magnitude of the capacitance formed by the insulating film (the gate insulating film) interposed between the electrode formed in the same layer as the gate line and the electrode formed in the same layer as the source line is about 100 to 200 pF/mm$^2$. Assuming that the magnitude of the capacitance is 125 pF/mm$^2$, there is required an area of about 0.4 mm by 0.4 mm in order to form a 20 pF capacitor.

In FIG. 10, five spare capacitor connection wires 5 and five first electrodes 10c of spare capacitors formed in the same layer as the source line 2 are provided along the first wire 3a formed in the same layer as the gate line 1. The size of the first electrode 10c is about 0.4 mm by 0.4 mm as described above. Note that a portion of the common electrode wire 21a formed in the same layer as the gate line 1 that overlaps with the first electrode 10c is the second electrode 10d. Each source line 2 is connected to the corresponding source line terminal section 2b formed in the same layer as the gate line 1 in the terminal region via a contact hole (not shown) formed in the gate insulating film 19 near the boundary between the wiring region and the terminal region.

FIG. 10 is drawn with the ratio between the size of the common electrode wire 21a and the size of the first electrode 10c of the spare capacitor being approximate to that in an actual liquid crystal display panel, and therefore suggests that the first electrodes 10c of the spare capacitors can be formed easily, area-wise, on the common electrode wire 21a.

Furthermore, as the size of the liquid crystal display panel increases, the parasitic capacitance per one source line also increases. Then, the magnitude of the capacitance of the spare capacitor needed also increases, thereby proportionally increasing the area for forming the electrodes of the spare capacitors. However, as the size of the liquid crystal display panel increases, the wiring region increases accordingly, and therefore it is unlikely that the placement of the electrodes of the spare capacitors becomes impossible area-wise.

Conversely, where the size of the liquid crystal display panel is small, the wiring region also decreases. However, since the parasitic capacitance per one source line also decreases, the capacitance of the spare capacitor required also decreases. Thus, it is unlikely that the placement of the electrodes of the spare capacitors becomes impossible area-wise.

As described above, in the liquid crystal display device 50 of the present invention, spare wires (3a and 3b) can be connected to the source line 2. Therefore, if one of the source lines 2 breaks, the spare wire (3a and 3b) can be connected to the broken source line (2a and 2b), whereby a signal voltage according to the source signal is applied to the source line 2b beyond the wire breakage position via the spare wire (3a and 3b). Furthermore, since the first electrodes 10c of the spare capacitors (10a and 10b) are configured so that they can be connected to the spare wires (3a and 3b), the spare capacitors can be connected to the spare wires and the display wire by connecting the first electrodes 10c of the spare capacitors (10a and 10b) to the spare wires (3a and 3b). By connecting the first electrode 10c of the spare capacitor (10a and 10b) to the spare wire (3a and 3b) for a predetermined number of the spare capacitors as necessary, it is possible to adjust the number of the spare capacitors (10a and 10b) to be made operative.

In this way, it is possible to adjust the load on a source line (2a and 2b) divided in a wire breakage, and it is possible to adjust the signal waveform according to the source signal applied to the source line (2a and 2b) via the spare wire (3a and 3b). Therefore, it is possible to fix a wire breakage along the source line 2 in such a manner that a decrease in the display quality is suppressed, irrespective of the wire breakage position along the source line 2.

Moreover, since the spare capacitors (10a and 10b) are provided on the active matrix substrate, the step of connecting the source lines (2a and 2b) divided in a wire breakage to the spare wires (3a and 3b) (the spare wire connecting step) and the step of making the spare capacitors operative for the spare wires (3a and 3b) (the spare capacitor connecting step) can be performed in a single step or as consecutive steps, thus making the fixing of a wire breakage more reliable. Conversely, where the spare capacitors are provided on a substrate different from the active matrix substrate, as in Embodiments 3 and 4 to be described later, the record of the spare wire connecting step that a divided display wire and a spare wire have been connected together after detecting a wire breakage is likely to become unclear at the time when performing the step of making the spare capacitors operative (the spare capacitor connecting step), whereby the fixing of a wire breakage may be unreliable.

Moreover, since the spare capacitors (10a and 10b) are provided in a non-display region that has no contribution to the display, it is possible to fix a wire breakage along the source line 2 without influencing the display quality.

Since the first insulating film of the spare capacitors (10a and 10b), the second insulating film insulating the source lines 2 and the spare wires (3a and 3b) from each other, the third insulating film insulating the second electrodes 10d of the spare capacitors (10a and 10b) and the spare wires (3a and 3b) from each other, and the insulating film of the storage capacitor 27 are each formed by the gate insulating film 19, it is possible to fix a wire breakage along the source line 2 without adding a production step.

Embodiment 2

The present invention may employ the following configuration for Embodiment 1 as described above. In this and subsequent embodiments, like elements to those shown in FIG. 1 to FIG. 10 will be denoted by like reference numerals and will not be further described below.

In Embodiment 1, the first electrodes 10c of a plurality of first spare capacitors 10a and the first electrodes 10c of a plurality of second spare capacitors 10b are provided so that they can be connected to the first wire 3a and the second wire 3b together forming a spare wire, i.e., the first electrodes 10c of a plurality of first spare capacitors 10a and the first electrodes 10c of a plurality of second spare capacitors 10b are not connected in advance to the spare wire. In contrast, in the present embodiment, the first electrodes 10c of a plurality of first spare capacitors 10a and the first electrodes 10c of a plurality of second spare capacitors 10b are connected in advance to the first wire 3a and the second wire 3b together forming a spare wire. Otherwise, the configuration is substantially the same as that of Embodiment 1, and will not be further described below.

Figure 11:
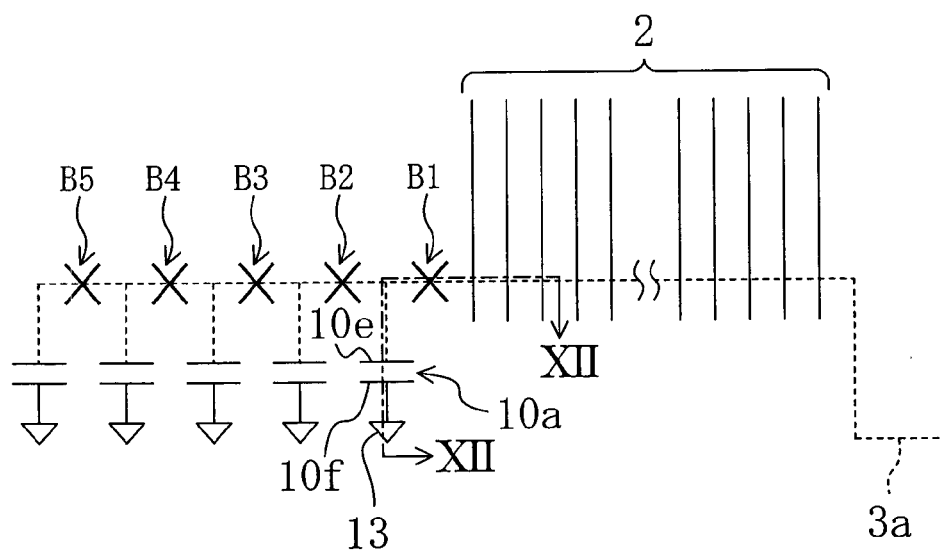
FIG. 11 is an equivalent circuit diagram showing a spare capacitor of a liquid crystal display device according to Embodiment 2 of the present invention.
Figure 12:
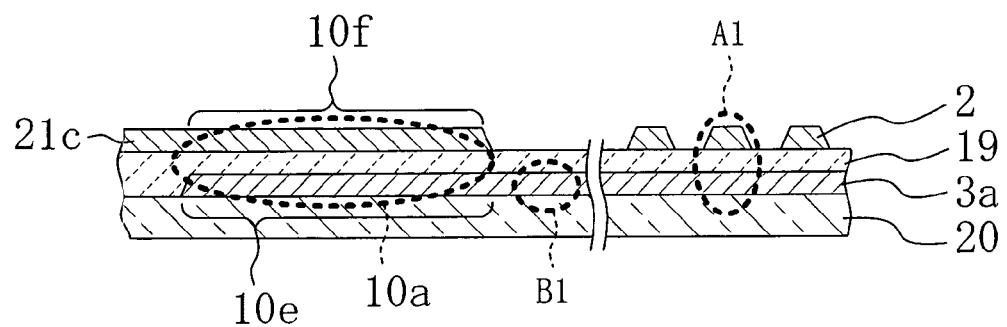
FIG. 12 is a cross-sectional view taken along line XII-XII of FIG. 1.

FIG. 11 is a plan view showing the configuration of the first wire 3a and the first spare capacitors 10a, and corresponds to FIG. 5 of Embodiment 1. FIG. 12 is a cross-sectional view taken along line XII-XII of FIG. 11.

In the liquid crystal display device of the present embodiment, five first spare capacitors 10a are provided, for example, for the first wire 3a as shown in FIG. 11.

As shown in FIG. 12, the first spare capacitor 10a includes a first electrode 10e and a second electrode 10f provided so as to oppose each other, and the gate insulating film 19 (the first insulating film) interposed between the first electrode 10e and the second electrode 10f.

The first electrode 10e is an extended portion of the first wire 3a of the spare wire.

The second electrode 10f is an extended portion of a common electrode wire 21c, which is provided over the first electrode 10e via the gate insulating film 19 therebetween. In this way, since the first electrode 10e of the first spare capacitor 10a and the first wire 3a are integral with each other, the first electrode 10e of the first spare capacitor 10a is connected in advance to the first wire 3a of the spare wire.

As shown in FIG. 11, the first wire 3a diverges into five branches, wherein the distal end of each branch forms the first electrode 10e and the proximal end thereof is one of cut-off positions B1 to B5.

The common electrode wire 21c is a portion that is connected to the common electrode 13 of the counter substrate via the common electrode transition point 21b.

The configuration of the second spare capacitor 10b is similar to that of the first spare capacitor 10a except that the second spare capacitor 10b is located in an area along the lower side of the liquid crystal display panel 40, and will not be further described below.

A method for producing the liquid crystal display device 50 according to Embodiment 2 of the present invention will now be described.

The liquid crystal display device 50 according to Embodiment 2 of the present invention is produced through an active matrix substrate production step, a counter substrate production step, a liquid crystal display panel production step, an inspection step and a driver mounting step to be described below, wherein a wire breakage fixing step is performed after the inspection step if a wire breakage is detected in the inspection step.

Note that the counter substrate production step, the liquid crystal display panel production step, the inspection step and the driver mounting step are substantially the same as those of Embodiment 1, and will not be further described below.

Active Matrix Substrate Production Step

The active matrix substrate production step will now be described.

First, a metal film made of Ta, a TaMo alloy, or the like (thickness: 1000 to 2000 Å) is deposited by a sputtering method entirely across the substrate on the glass substrate 20, and is then patterned by the PEP technique to thereby form the gate lines 1, the gate electrodes 1a, the capacitor lines 15, the first wires 3a (the first electrodes 10e), and the second wires 3b (the first electrodes 10e).

Then, a silicon nitride film (thickness: about 400 nm), or the like, is deposited by a CVD method entirely across the substrate on which the gate lines 1, etc., have been formed to thereby form the gate insulating film 19.

Then, an intrinsic amorphous silicon film (thickness: about 150 nm) and a phosphorus-doped n+ amorphous silicon film (thickness: about 50 nm) are deposited successively by a CVD method entirely across the substrate on the gate insulating film 19, and are patterned into an island-like pattern on the gate electrode 1a by the PEP technique to thereby form a semiconductor layer including an intrinsic amorphous silicon layer and an n+ amorphous silicon layer.

Then, a metal film (thickness: 1000 to 2000 Å) made of Ti, or the like, is deposited by a sputtering method entirely across the substrate on which the semiconductor layer has been formed, and is patterned by the PEP technique to thereby form the source lines 2, the source electrodes 2a, the drain electrodes 14 and the common electrode wires 21c (the second electrodes 10f).

While the semiconductor layer may be an amorphous silicon film as described above, a polysilicon film may be deposited alternatively, and the amorphous silicon film and the polysilicon film may be subjected to a laser annealing process to improve the crystallinity. Then, the traveling speed of electrons through the semiconductor layer is increased, and the characteristics of the TFT 11 can be improved.

Furthermore, a silicon nitride film (thickness: about 3000 Å), or the like, is deposited by a CVD method entirely across the substrate on which the source line 2, etc., have been formed to thereby form the protection film 17.

Then, portions of the protection film 17 corresponding to the drain electrodes 14 are etched away to form the contact holes 16.

Then, a transparent conductive film (thickness: about 1000 Å) being an ITO (Indium Tin Oxide) film is deposited by a sputtering method entirely across the substrate on the protection film 17, and is then patterned by the PEP technique to thereby form the pixel electrodes 18.

Finally, a polyimide resin is printed to a thickness of 500 to 1000 Å entirely across the substrate on the pixel electrode 18, after which the substrate is baked and subjected to a rubbing treatment in one direction with a spinning cloth to thereby form an alignment film.

The active matrix substrate is produced as described above.

The active matrix substrate produced in the active matrix substrate production step and the counter substrate produced in the counter substrate production step described above in Embodiment 1 are attached together, and then a liquid crystal material is injected into the structure, thus producing a liquid crystal display panel. Then, the inspection step as described above in Embodiment 1 is performed. If a wire breakage is detected in the inspection step, the following wire breakage fixing step is performed.

Wire Breakage Fixing Step

The wire breakage fixing step includes a spare wire connecting step and a cutting step to be described below.

The spare wire connecting step is substantially the same as that of Embodiment 1, and will not be further described below.

Cutting Step

Where the source line 2 breaks in a position similar to the wire breakage position X of Embodiment 1, since the wire breakage position X is at a position close to the source driver 7, the load on the source line 2b below the wire breakage position X is not significantly different from the load on a normal source line 2 that is not broken. Thus, the connection between the second wire 3b of the spare wire and the first electrode 10e of the second spare capacitor 10b is disconnected. On the other hand, the load on the source line 2a above the wire breakage position X is significantly smaller than the load on a normal source line 2, whereby the connection between the first wire 3a of the spare wire and the first electrode 10c of the first spare capacitor 10a is not disconnected.

Specifically, at least one of the cut-off positions B1 to B5 shown in FIG. 11 is irradiated with the light energy 23 such as laser light from the side of the glass substrate 20 as shown in FIG. 8 to thereby destroy the first wire 3a at the irradiated position. Then, the load on the source line 2a above the wire breakage position X is substantially the same as the load on a normal source line 2, thus adjusting the signal waveform to be applied to the source line 2a.

Next, how the first spare capacitor 10a and the second spare capacitor 10b to be made operative for the first wire 3a and the second wire 3b, respectively, of the spare wire 3 are used differently will be described with reference to FIG. 9 as in Embodiment 1.

Schemes for cutting off the first spare capacitors 10a and the second spare capacitors 10b for specific wire breakage positions will now be described.

(a) Where the source line 2 breaks in the region A, the first wire 3a is not cut off, and the second wire 3b is cut off at the cut-off position B1.

(b) Where the source line 2 breaks in the region B, the first wire 3a is cut off at the cut-off position B5, and the second wire 3b is cut off at the cut-off position B2.

(c) Where the source line 2 breaks in the region C, the first wire 3a is cut off at the cut-off position B4, and the second wire 3b is cut off at the cut-off position B3.

(d) Where the source line 2 breaks in the region D, the first wire 3a is cut off at the cut-off position B3, and the second wire 3b is cut off at the cut-off position B4.

(e) Where the source line 2 breaks in the region E, the first wire 3a is cut off at the cut-off position B2, and the second wire 3b is cut off at the cut-off position B5.

(f) Where the source line 2 breaks in the region F, the first wire 3a is cut off at the cut-off position B1, and the second wire 3b is not cut off.

Thus, by performing the cut-off schemes (a) to (f), the load on the source line divided in a wire breakage is made substantially the same as the load on a normal source line 2 that is not broken, thereby adjusting the signal waveform according to the source signal to be applied to the source line 2 via the spare wire 3.

In Embodiment 1, where the first electrodes 10c of the spare capacitors 10a and 10b are configured so that they can be connected to the spare wires 3 (the first wires 3a and the second wires 3b), three of the intersections C1 to C5 shown in FIG. 5 need to be irradiated with a light energy in order to make three spare capacitors 10a operative for the first wire 3a, for example. In contrast, in the present embodiment, only the position B4 of the cut-off positions B1 to B5 shown in FIG. 11 needs to be irradiated with a light energy. Therefore, with the present embodiment, it is possible to reduce the number of positions to be irradiated with a light energy. Thus, it is possible to simplify the wire breakage fixing step, and to suppress the damage to the wiring pattern around the position to be irradiated with a light energy.

As described above, in the liquid crystal display device 50 of the present invention, spare wires (3a and 3b) can be connected to the source line 2. Therefore, if one of the source lines 2 breaks, the spare wire (3a and 3b) can be connected to the broken source line (2a and 2b), whereby a signal voltage according to the source signal is applied to the source line 2b beyond the wire breakage position via the spare wire (3a and 3b). Since the first electrodes 10c of the spare capacitors (10a and 10b) are connected in advance to the spare wires (3a and 3b), the spare capacitors (10a and 10b) can be made operative for a broken source line (2a and 2b) by connecting the broken source line (2a and 2b) to the spare wires. In a case where there are a plurality of spare capacitors (10a and 10b), it is possible to adjust the number of spare capacitors (10a and 10b) to be made operative by cutting off the connection between the first electrode 10c of the spare capacitor (10a and 10b) and the spare wire (3a and 3b) for a predetermined number of spare capacitors. Thus, the load on the source line (2a and 2b) divided in a wire breakage is adjusted, whereby it is possible to adjust the signal waveform according to the source signal applied to the source line (2a and 2b) via the spare wires (3a and 3b). Therefore, it is possible to fix a wire breakage along the source line 2 in such a manner that a decrease in the display quality is suppressed, irrespective of the wire breakage position along the source line 2.

Embodiment 3

The present invention may employ the following configuration for Embodiments 1 and 2.

While the spare capacitors 10a and 10b are provided on the liquid crystal display panel 40 (the active matrix substrate) in Embodiments 1 and 2, the spare capacitors 10 are provided on a source substrate 25 in the present embodiment.

Figure 13:
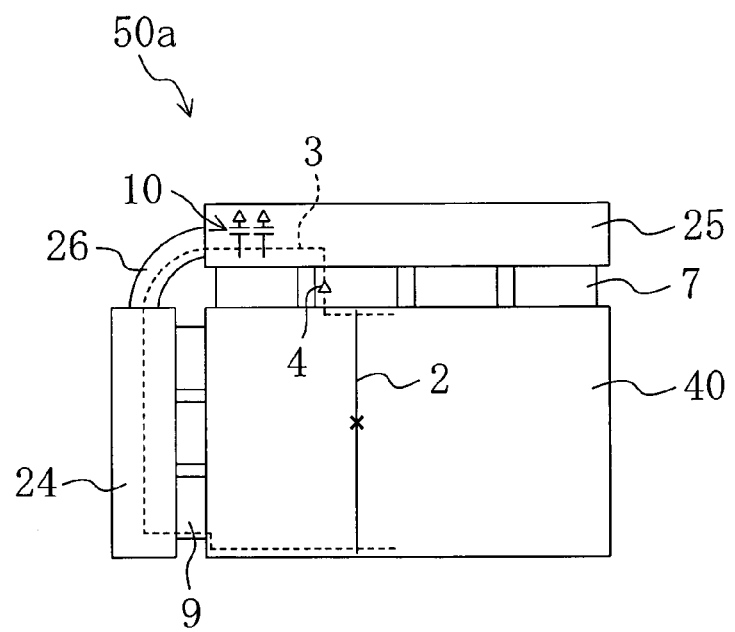
FIG. 13 is a plan view showing a liquid crystal display device according to Embodiment 3 of the present invention.

FIG. 13 is a plan view showing a liquid crystal display device 50a according to Embodiment 3 of the present invention.

The liquid crystal display device 50a includes the liquid crystal display panel 40, the gate driver 9 provided along the left side of the liquid crystal display panel 40, a gate substrate 24 provided along the left side of the gate driver 9, the source driver 7 provided along the upper side of the liquid crystal display panel 40, the source substrate 25 provided along the upper side of the source driver 7, and an FPC 26 provided between the gate substrate 24 and the source substrate 25.

The gate substrate 24 is a device substrate for inputting signals to the gate driver 9, and the source substrate 25 is a device substrate for inputting signals to the source driver 7.

The FPC 26 is a flexible printed wiring board (Flexible Printed Circuit) including various wiring layers interposed between polyimide films.

The spare wire 3 (the second wire 3b in Embodiments 1 and 2) extends from the output side of the buffer section to an area along the lower side of the liquid crystal display panel 40 via the source substrate 25, the FPC 26, the gate substrate 24 and the gate driver 9. The spare capacitors 10 are provided along the spare wire 3 in the source substrate 25. Therefore, by making the spare capacitors 10 operative as necessary according to the wire breakage position along the source line 2, it is possible to adjust the signal waveform according to the source signal applied to the source line 2 via the spare wire 3 and to suppress the decrease in the display quality.

While the spare capacitors 10 are provided on the source substrate 25 in the present embodiment, the spare capacitors 10 may alternatively be provided on the gate substrate 24 or on both the gate substrate 24 and the source substrate 25.

Embodiment 4

The present invention may employ the following configuration for Embodiments 1 and 2.

While the spare capacitors 10a and 10b are provided on the liquid crystal display panel 40 (the active matrix substrate) in Embodiments 1 and 2, the spare capacitors 10 are provided on the source substrate 25 in the present embodiment.

Figure 14:
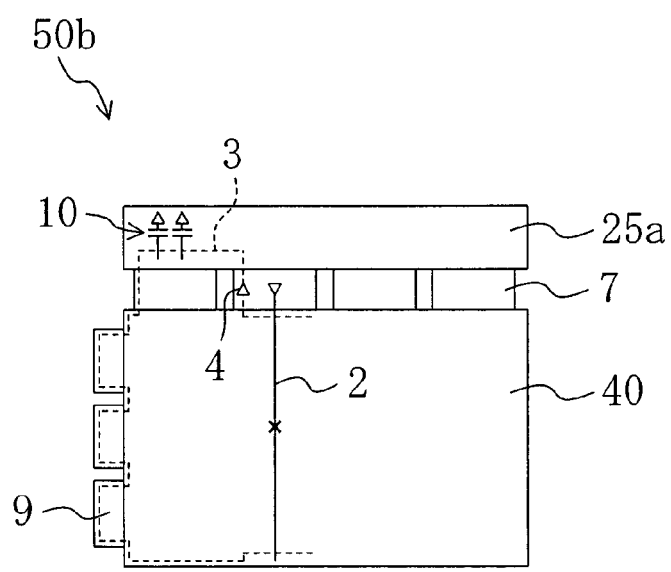
FIG. 14 is a plan view showing a liquid crystal display device according to Embodiment 4 of the present invention.
Figure 15:
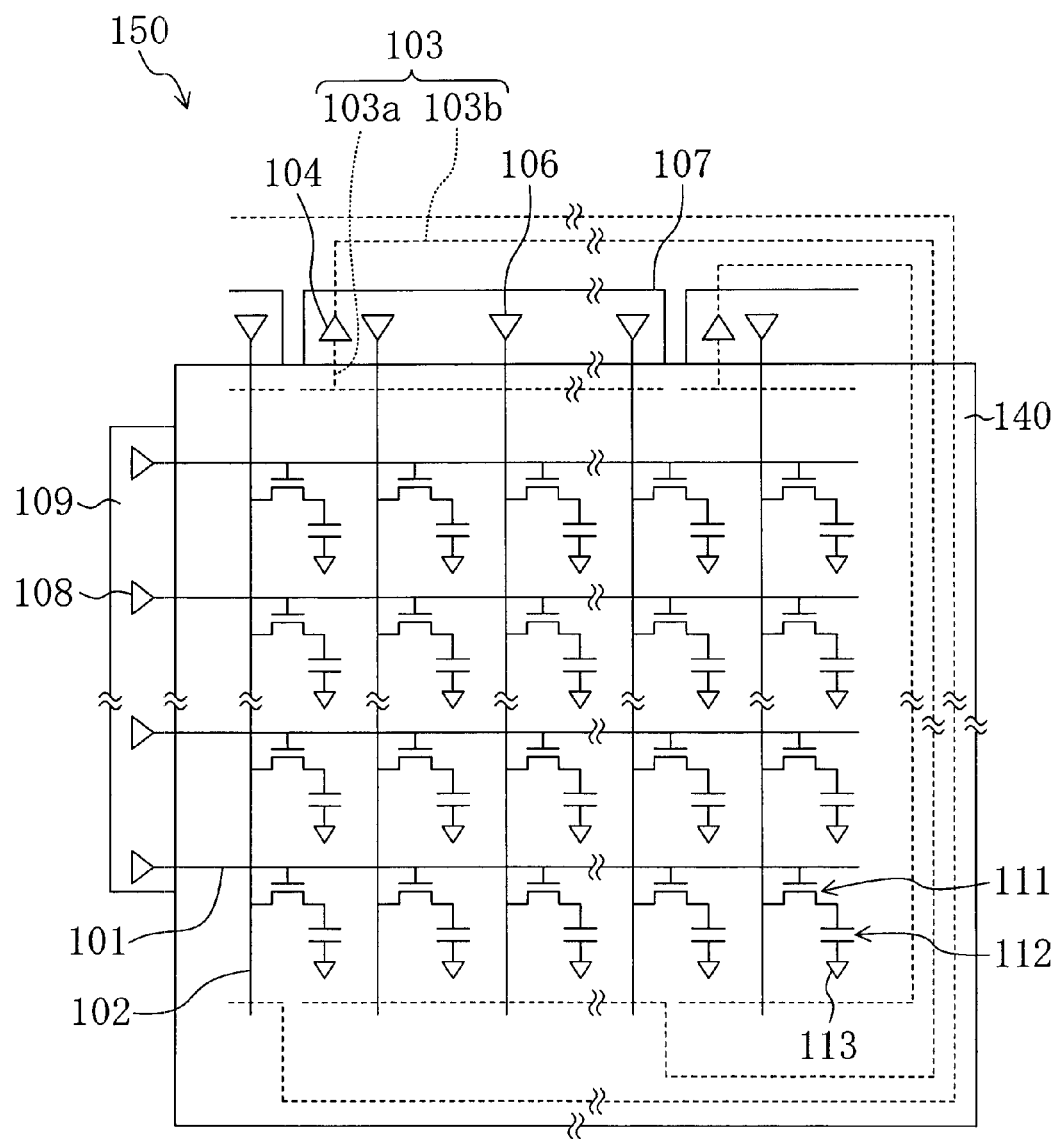
FIG. 15 is an equivalent circuit diagram showing a conventional liquid crystal display device.

FIG. 14 is a plan view showing a liquid crystal display device 50b according to Embodiment 4 of the present invention.

The liquid crystal display device 50b includes the liquid crystal display panel 40, the gate driver 9 provided along the left side of the liquid crystal display panel 40, the source driver 7 provided along the upper side of the liquid crystal display panel 40, and a source substrate 25a provided along the upper side of the source driver 7.

The source substrate 25a is a device substrate for inputting signals to the gate driver 9 and the source driver 7.

The spare wire 3 (the second wire 3b in Embodiments 1 and 2) extends from the output side of the buffer section to an area along the lower side of the liquid crystal display panel 40 via the source substrate 25a and the gate drivers 9. The spare capacitors 10 are provided along the spare wire 3 in the source substrate 25a. Therefore, by making the spare capacitors 10 operative as necessary according to the wire breakage position along the source line 2, it is possible to adjust the signal waveform according to the source signal applied to the source line 2 via the spare wire 3 and to suppress the decrease in the display quality.

As described above, in the liquid crystal display devices 50, 50a and 50b of the present invention, spare wires (3a and 3b) can be connected to the source line 2. Therefore, if one of the source lines 2 breaks, the spare wire (3a and 3b) can be connected to the broken source line (2a and 2b), whereby a signal voltage according to the source signal is applied to the source line 2b beyond the wire breakage position via the spare wire (3a and 3b). Since the spare capacitors (10a and 10b) for adjusting the signal waveform are provided along the spare wire (3a and 3b), it is possible to adjust the signal waveform according to the source signal applied to the display wire via the spare wire (3a and 3b) and to suppress the decrease in the display quality by making the spare capacitors operative as necessary according to the wire breakage position.

In the present embodiment and Embodiment 3, the substrate (the source substrate) on which the spare capacitors 10 are provided is different from the active matrix substrate, it is difficult to perform the spare capacitor connecting step and the spare wire connecting step simultaneously or consecutively. This is because once the source line 2 is fixed, it is difficult to detect where the wire breakage position is along the source line 2. In other words, once a wire breakage fixing operation is performed on the source line 2, it will then be difficult to identify how many spare capacitors (10a and 10b) need to be connected to which spare wire (3a and 3b) of the liquid crystal display panel 40 because the wire breakage has been fixed.

Embodiment 1 is directed to a liquid crystal display device including spare capacitors of the type where the first electrodes of the spare capacitors are not connected in advance to the spare wires, and Embodiment 2 is directed to a liquid crystal display device including spare capacitors of the type where the first electrodes of the spare capacitors are connected in advance to the spare wires. Alternatively, a liquid crystal display device of the present invention may include spare capacitors of both types.

As described above, with the present invention, it is possible to fix a wire breakage along a source line in such a manner that the decrease in the display quality is suppressed, irrespective of the wire breakage position along the source line, and the present invention is therefore useful as matrix-type liquid crystal display devices for use in TV sets and monitors.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device, comprising:
 a plurality of display wires to which display signal voltages are applied;
 a spare wire that can be connected to opposite ends of at least one of the plurality of display wires; and
 a buffer section provided along the spare wire for impedance conversion along the spare wire,
 wherein the display device comprises a spare capacitor for adjusting a signal waveform to be applied to the display wire with the spare wire being connected the display wire.

2. The display device of claim 1, wherein the spare capacitor includes a first electrode and a second electrode provided so as to oppose each other, and a first insulating film interposed between the first electrode and the second electrode.

3. The display device of claim 2, wherein the first electrode is connected to the spare wire.

4. The display device of claim 2, wherein the first electrode is configured so that the first electrode can be connected to the spare wire.

5. The display device of claim 2, wherein:
 the display device comprises a plurality of spare capacitors; and
 the first electrode of at least one of the plurality of spare capacitors is connected to the spare wire, and the first electrode of another one of the plurality of spare capacitors is configured so that the first electrode can be connected to the spare wire.

6. The display device of claim 2, wherein the spare wire is provided over the display wire via a second insulating film therebetween, and the spare wire can be connected to the display wire by making a contact hole in the second insulating film.

7. The display device of claim 6, wherein the first electrode is provided over the spare wire via a third insulating film therebetween, and the first electrode can be connected to the spare wire by making a contact hole in the third insulating film.

8. The display device of claim 1, wherein:
 the spare wire includes a first wire being on an input side of the buffer section and a second wire being on an output side of the buffer section; and
 the spare capacitor is provided along the first wire.

9. The display device of claim 1, wherein:
 the spare wire includes a first wire being on an input side of the buffer section and a second wire being on an output side of the buffer section; and
 the spare capacitor is provided along the second wire.

10. The display device of claim 1, wherein:
 the spare wire includes a first wire being on an input side of the buffer section and a second wire being on an output side of the buffer section; and
 the spare capacitor is provided both on the first wire and on the second wire.

11. The display device of claim 1, wherein the display wire is a source line to which a source signal is input.

12. The display device of claim 1, wherein:
 the plurality of display wires are formed on a substrate; and
 the spare capacitor is provided on the substrate.

13. The display device of claim 1, wherein:
 the display device comprises a display region that contributes to display and a non-display region that is provided outside the display region and that does not contribute to display; and
 the spare capacitor is provided in the non-display region.

14. The display device of claim 7, wherein the first insulating film, the second insulating film and the third insulating film are the same insulating film.

15. The display device of claim 14, wherein the display device comprises:

a plurality of pixels;

a pixel electrode provided for each of the plurality of pixels and connected to the display wire, wherein a signal voltage is supplied to the pixel electrode; and a storage capacitor formed by the same insulating film for holding the signal voltage in the pixel electrode.

16. The display device of claim 3, wherein the display device comprises one spare capacitor.

17. A display device, comprising:

a plurality of display wires to which display signal voltages are applied;

a spare wire that can be connected to opposite ends of at least one of the plurality of display wires; and a buffer section provided along the spare wire for impedance conversion along the spare wire, wherein:

the display device comprises a spare capacitor for adjusting a signal waveform to be applied to the display wire with the spare wire being connected the display wire;

the spare capacitor includes a first electrode and a second electrode provided so as to oppose each other, and a first insulating film interposed between the first electrode and the second electrode;

one of the plurality of display wires is broken;

the broken display wire and the spare wire are connected to each other; and the spare wire is connected to the first electrode.

18. A liquid crystal display device, comprising:

a plurality of display wires to which display signal voltages are applied;

a spare wire that can be connected to opposite ends of at least one of the plurality of display wires; and a buffer section provided along the spare wire for impedance conversion along the spare wire, wherein the liquid crystal display device comprises a spare capacitor for adjusting a signal waveform to be applied to the display wire with the spare wire being connected the display wire.

* * * * *